US008044157B2

(12) United States Patent
Torii et al.

(10) Patent No.: US 8,044,157 B2

(45) Date of Patent: Oct. 25, 2011

(54) WATER ABSORBENT RESIN PRODUCTION METHOD AND USAGE THEREOF

(75) Inventors: Kazushi Torii, Hyogo (JP); Taishi Kobayashi, Hyogo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 27 days.

(21) Appl. No.: 12/530,976

(22) PCT Filed: Mar. 14, 2008

(86) PCT No.: PCT/JP2008/055181

§ 371 (c)(1), (2), (4) Date: Sep. 11, 2009

(87) PCT Pub. No.: WO2008/114847

PCT Pub. Date: Sep. 25, 2008

(65) Prior Publication Data

US 2010/0041824 A1 Feb. 18, 2010

(30) Foreign Application Priority Data

Mar. 16, 2007 (JP) ................................ 2007-069634
Mar. 19, 2007 (JP) ................................ 2007-071627

(51) Int. Cl.
*C08F 120/06* (2006.01)

(52) U.S. Cl. ....... 526/317.1; 526/89; 526/210; 526/217; 524/555; 524/556; 523/111

(58) Field of Classification Search .................... 526/89, 526/210, 217, 317.1; 524/555, 556; 523/111
See application file for complete search history.

(56) References Cited

U.S. PATENT DOCUMENTS 5,624,967 A 4/1997 Hitomi et al.
(Continued)

FOREIGN PATENT DOCUMENTS

EP 0632068 1/1995
(Continued)

OTHER PUBLICATIONS

English-language Abstract of JP 2004-261797 A (Sep. 24, 2004).*
(Continued)

*Primary Examiner* — David W Wu
*Assistant Examiner* — Vu A Nguyen
(74) *Attorney, Agent, or Firm* — Roylance, Abrams, Berdo & Goodman, L.L.P.

(57) ABSTRACT

A method for producing a water absorbent resin comprises the steps of: (i) polymerizing a monomer including an unsaturated monomer containing a carboxyl group, in the presence of an internal cross-linking agent (A) having two or more radical polymerizable unsaturated groups in its single molecule and in the presence of a non-polymeric internal cross-linking agent (B) having in its single molecule two or more functional groups each of which allows formation of an ester bond or an amide bond by reacting with a carboxyl group so as to obtain a cross-linked polymer hydrogel; (ii) crushing the cross-linked polymer hydrogel obtained in the step (i); and (iii) drying crushed cross-linked polymer hydrogel products obtained in the step (ii), wherein: an amount of the internal cross-linking agent (A) is 0.01 mol % or more and 0.2 mol % or less relative to an amount of the unsaturated monomer containing a carboxyl group, and a molar ratio (B)/(A) of the internal cross-linking agent (A) and the non-polymeric internal cross-linking agent (B) is 0.01 or more and 1.8 or less.

22 Claims, 1 Drawing Sheet

U.S. PATENT DOCUMENTS

| | | | |
|---|---|---|---|
| RE037,021 | E | 1/2001 | Aida |
| 6,228,930 | B1 | 5/2001 | Dairoku et al. |
| 6,458,921 | B1 | 10/2002 | Dairoku et al. |
| 6,750,262 | B1 | 6/2004 | Hahnle et al. |
| 2002/0061978 | A1 | 5/2002 | Hatsuda et al. |
| 2003/0008946 | A1 | 1/2003 | Dairoku et al. |
| 2003/0130640 | A1 | 7/2003 | Dodge, II et al. |
| 2004/0186244 | A1 | 9/2004 | Hatsuda et al. |
| 2006/0204755 | A1 | 9/2006 | Torii et al. |
| 2006/0235141 | A1 | 10/2006 | Riegel et al. |
| 2007/0060691 | A1 | 3/2007 | Kim |
| 2007/0178786 | A1* | 8/2007 | Nawata et al. ................ 442/118 |
| 2008/0027180 | A1* | 1/2008 | Higashimoto et al. ..... 525/330.3 |

FOREIGN PATENT DOCUMENTS

| | | |
|---|---|---|
| JP | 60177004 | 9/1985 |
| JP | 06200168 | 7/1994 |
| JP | 11057465 | 3/1999 |
| JP | 2000095955 | 4/2000 |
| JP | 2003020363 | 1/2003 |
| JP | 2004131596 | 4/2004 |
| JP | 2005200630 | 7/2005 |
| JP | 2006199805 | 8/2006 |
| JP | 2006225455 | 8/2006 |
| JP | 200818328 | 1/2008 |
| WO | 0145758 | 6/2001 |

OTHER PUBLICATIONS

Office Action in U.S. Appl. No. 12/530,957 dated Jul. 15, 2011.

* cited by examiner

WATER ABSORBENT RESIN PRODUCTION METHOD AND USAGE THEREOF

TECHNICAL FIELD

The present invention relates in general to a water absorbent resin production method and usage thereof. The present invention particularly relates to (i) a method for producing a water absorbent resin that reduces an amount of fine powder even in a case where polymerization is carried out in the presence of a large amount of an internal cross-linking agent, in which method a cross-linked polymer hydrogel obtained by polymerization in the presence of the internal cross-linking agent is dried after crushed in a crushing step to a size with which the cross-linked polymer hydrogel cross-linked polymer hydrogel is easily dried and (ii) usage thereof.

BACKGROUND ART

A water absorbent resin obtained by polymerizing an unsaturated monomer containing a carboxyl group is widely used for various applications such as application as sanitary materials, e.g., disposable diapers for babies, sanitary napkins, and incontinent pads, application as a cable waterproofing agent, application in agriculture/horticulture, application in civil engineering and construction, and food related application. The water absorbent resin is typically obtained as a result of processes including a step of drying a cross-linked polymer hydrogel crushed to a size easy to dry, a pulverization step, a classification step, a surface cross-linking step, and the like. The cross-linked polymer hydrogel is obtained by polymerizing an unsaturated monomer containing a carboxyl group in the presence of an internal cross-linking agent.

In the production of the water absorbent resin, a method used as a method of crushing the cross-linked polymer hydrogel to a size with which the cross-linked polymer hydrogel is easily dried is one or a combination of a method of concurrently polymerizing and crushing in a reaction container including crushing means and a method of crushing the cross-linked polymer hydrogel by a crusher or the like after polymerization without crushing.

In particular, the method of crushing the cross-linked polymer hydrogel by a crusher or the like after polymerization is superior in that the method makes it possible to crush the cross-linked polymer hydrogel to a size with which the cross-linked polymer hydrogel obtained can be efficiently dried reliably and uniformly.

For example, FIG. 1*a* shows one example of a method in which the cross-linked polymer hydrogel is crushed by a crusher after a monomer is polymerized without crushing. As illustrated in FIG. 1*a*, a band shaped cross-linked polymer hydrogel 3 obtained by polymerization in a polymerization apparatus 1 is crushed by a crusher 2, thereby providing a crushed cross-linked polymer hydrogel that is a jelly-like crushed articles of the cross-linked polymer hydrogel.

For production of a water absorbent resin obtained by polymerizing an unsaturated monomer containing a carboxyl group, some reports deal with a method of using, as an internal cross-linking agent, a combination, in a predetermined proportion, of (i) an internal cross-linking agent having at least two radical polymerizable unsaturated groups in its molecule and (ii) an internal cross-linking agent having in its molecule at least two functional groups that can react with a carboxylic group (Refer to, for example, Patent Documents 1 through 6).

For example, Patent Document 1 discloses a technique in which (i) a compound having at least two unsaturated groups in its molecule and (ii) a compound having at least two epoxy groups in its single molecule as functional groups that can react with a carboxylic group are used in a specific proportion in polymerization, for the purpose of producing a water absorbent resin that has excellent absorbency under pressure and low extractable polymer content.

Moreover, Patent Document 2 discloses a technique in which a cross-linking agent containing a polyvinyl first cross-linking agent and a hydroxyl-containing second cross-linking agent are used in polymerization for the purpose of producing a water absorbent resin having a high gel bed permeability (i.e. liquid permeability) and a low absorption capacity.

Further, Patent Document 3 discloses a technique in which a compound containing at least two unsaturated groups in its single molecule and alkylene carbonate are used in polymerization for the purpose of providing a water absorbent resin generating sound in water-absorption.

In addition, Patent Documents 4 through 6 disclose a technique in which an acrylic ammonium salt, an internal cross-linking agent having at least two unsaturated groups in its single molecule, and a condensation-type cross-linking agent such as glycerin are used for the purpose of improving absorbing performance.

[Patent Document 1] Japanese Unexamined Patent Publication No. 188602/1996 (Tokukaihei 8-188602) (published on Jul. 23, 1996)

[Patent Document 2] Japanese Unexamined Patent Publication No. 518150/2003 (Tokukai 2003-518150) (published on Jun. 3, 2003)

[Patent Document 3] Japanese Unexamined Patent Publication No. 200168/1994 (Tokukaihei 6-200168) (published on Jul. 19, 1994)

[Patent Document 4] Japanese Unexamined Patent Publication No. 200630/2005 (Tokukai 2005-200630) (published on Jul. 28, 2005)

[Patent Document 5] Japanese Unexamined Patent Publication No. 199805/2006 (Tokukai 2006-199805) (published on Aug. 3, 2006)

[Patent Document 6] Japanese Unexamined Patent Publication No. 225455/2006 (Tokukai 2006-225455) (published on Aug. 31, 2006)

DISCLOSURE OF INVENTION

Problems to be Solved by the Invention

However, recently, in view of water absorbent properties of a water absorbent resin, there is an increasing trend in which polymerization is carried out in the presence of a large amount of internal cross-linking agent. In such a region where the internal cross-linking agent(s) abounds, there occur problems such that a lot of fine power is generated when the water absorbent resin obtained by crushing and drying after polymerization is damaged in a subsequent process. This damage occurs when the particles of the water absorbent resin are scraped by friction between the particles or when the absorbent resin is influenced by an impact during pneumatic transportation.

The generation of the fine powder not only deteriorates performance of the water absorbent resin but also deteriorates convenience in handling of the water absorbent resin. Further, the generation of the fine powder is not preferable in regard to safety matters.

Conventionally, there have been reported various methods for solving the problem of the fine powder generated by damage to the water absorbent resin, for example, a method of crushing a water absorbent resin having low water content, a method of polymerizing a special monomer and a polymerizable cross-linking agent in combination, and a method of improving resistance to damage by increasing a water content. However, all of those methods reported are not sufficient.

The present invention is attained in view of the problems mentioned above. The purpose of the present invention is to provide a method for producing a water absorbent resin that reduces an amount of fine powder even in a case where polymerization is carried out in the presence of a large amount of an internal cross-linking agent, in which method a cross-linked polymer hydrogel obtained by polymerization in the presence of the internal cross-linking agent is dried after being crushed in a crushing step to a size with which the hydrogel-linked polymer is easily dried.

Means to Solve the Problems

The inventors of the present invention diligently studied the problems mentioned above. As a result, the inventors attended to that, in a method for producing a water absorbent resin in which cross-linked polymer hydrogel obtained by polymerization in the presence of the internal cross-linking agent is dried after crushed, the crushed cross-linked polymer hydrogel includes a a relatively large particle to which microparticles adhere as illustrated in a part enclosed by a dotted line in FIG. 1*b* or a crushed polymer having a pointed end as illustrated by a dashed line in FIG. 1*b*, in a region where the internal cross-linking agent(s) abounds, and further such crushed polymers increase as a degree of cross-liking increases. From this, the inventors conceived that a lot of fine powder is produced, because the pointed end is split off at the part shown by the dashed line and comes off or the microparticles adhering are scraped off at the time when the particles of the crushed substance are scraped due to friction between the water absorbent resin or influenced by an impact during pneumatic transportation.

In this view, the inventors considered that the crushed polymers as illustrated in FIG. 1*b* are produced by crushing because the cross-linked polymer hydrogel becomes a hard gel in the region where the internal cross-linking agent(s) abounds. Consequently, the inventors found that it is possible to reduce the generation of the fine powder and to achieve a high degree of cross-linking by crushing the cross-linked polymer hydrogel in a soft gel state by modifying types and amounts of the two internal cross-linking agents. As a result, the inventors have accomplished the present invention.

In order to solve the problem mentioned above, a method of the present invention for producing a water absorbent resin comprises the steps of: (i) polymerizing a monomer including an unsaturated monomer containing a carboxyl group, in the presence of an internal cross-linking agent (A) having two or more radical polymerizable unsaturated groups in its single molecule and in the presence of a non-polymeric internal cross-linking agent (B) having in its single molecule two or more functional groups each of which allows formation of an ester bond or an amide bond by reacting with a carboxyl group so as to obtain a cross-linked polymer hydrogel; (ii) crushing the cross-linked polymer hydrogel obtained in the step (i); and (iii) drying crushed cross-linked polymer hydrogel products obtained in the step (ii), wherein: an amount of the internal cross-linking agent (A) is 0.01 mol % or more and 0.2 mol % or less relative to an amount of the unsaturated monomer containing a carboxyl group, and a molar ratio (B)/(A) of the internal cross-linking agent (A) and the non-polymeric internal cross-linking agent (B) is 0.01 or more and 1.8 or less.

According to the method of the present invention for producing the water absorbent resin, it is preferable that the internal cross-linking agent (B) has in its single molecule two or three functional groups each of which allows formation of an ester bond or an amide bond by reacting with a carboxyl group.

According to the method of the present invention for producing the water absorbent resin, it is preferable that each of the functional groups of the internal cross-linking agent (B) which functional group allows formation of the ester bond or the amide bond by reacting with a carboxyl group reacts with the carboxyl group at 110° C. or higher temperature.

According to the method of the present invention for producing the water absorbent resin, it is preferable that each of the functional groups is a hydroxyl group.

According to the method of the present invention for producing the water absorbent resin, it is preferable that a molecular weight of the internal cross-linking agent (B) is 40 or more and 500 or less.

According to the method of the present invention for producing the water absorbent resin, it is preferable that the unsaturated monomer containing a carboxyl group is an acrylic acid and/or an alkali metal salt thereof.

According to the method of the present invention for producing the water absorbent resin, it is preferable that the step (iii) is carried out so that an amount of the internal cross-linking agent (B) remaining in the water absorbent resin obtained in the step (iii) is not more than $1.0\times10^{-5}$ mol/g.

According to the method of the present invention for producing the water absorbent resin, it is preferable to further comprise the step (iv) of mixing the water absorbent resin obtained in the step (iii) with a surface cross-linking agent and heating the mixture so as to cross-link the surface of the water absorbent resin.

According to the method of the present invention for producing the water absorbent resin, it is preferable that: the step (iv) is carried out so that a centrifugal retention capacity (CRC) of the water absorbent resin whose surface has been cross-linked is lower, by not less than 3 g/g, than a centrifugal retention capacity of the water absorbent resin whose surface has not been cross-linked and the centrifugal retention capacity (CRC) of the water absorbent resin whose surface has been cross-linked is not less than 26 g/g.

According to the method of the present invention for producing the water absorbent resin, it is preferable that the step (iv) is carried out so that an amount of the internal cross-linking agent (B) remaining in the water absorbent resin whose surface has been cross-linked is not more than $0.1\times10^{-5}$ mol/g.

A method for producing a water absorbing agent including the water absorbent resin and a liquid permeability improving agent is a method comprising the step of adding the liquid permeability improving agent to the water absorbent resin having been produced by the foregoing method.

In order to solve the problem mentioned above, a water absorbent resin of the present invention is obtained by polymerizing a monomer including an unsaturated monomer containing a carboxyl group, and has an internal cross-linked structure, and has been subjected to a surface cross-linking treatment, wherein the internal cross-linked structure including: an internal cross-linking agent (A) having two or more radical polymerizable unsaturated groups in its single molecule; and a non-polymeric internal cross-linking agent (B) having in its single molecule two or more functional groups each of which allows formation of an ester bond or an amide bond by reacting with a carboxyl group, and an amount of the internal cross-linking agent (A) is 0.01 mol % or more and 0.2 mol % or less relative to an amount of the unsaturated monomer containing a carboxyl group, and a molar ratio (B)/(A) of the internal cross-linking agent (A) and the non-polymeric internal cross-linking agent (B) is 0.01 or more and 1.8 or less.

According to the water absorbent resin of the present invention, it is preferable that the internal cross-linking agent (B) has in its single molecule two or three functional groups each of which allows formation of an ester bond or an amide bond by reacting with a carboxyl group.

According to the water absorbent resin of the present invention, it is preferable that each of the functional groups is a hydroxyl group.

According to the water absorbent resin of the present invention, it is preferable that a molecular weight of the internal cross-linking agent (B) is 40 or more and 500 or less.

According to the water absorbent resin of the present invention, it is preferable that the unsaturated monomer containing a carboxyl group is an acrylic acid and/or an alkali metal salt thereof.

According to the water absorbent resin of the present invention, it is preferable that a centrifugal retention capacity (CRC) of the water absorbent resin is not less than 26 g/g.

According to the water absorbent resin of the present invention, it is preferable that an amount of the internal cross-linking agent (B) remaining in the water absorbent resin is not more than $0.1 \times 10^{-5}$ mol/g.

It is preferable that a water absorbing agent of the present invention comprises the water absorbent resin and a liquid permeability improving agent.

EFFECT OF THE INVENTION

As mentioned above, a method for producing a water absorbent resin of the present invention comprises the steps of: (i) polymerizing a monomer including an unsaturated monomer containing a carboxyl group, in the presence of an internal cross-linking agent (A) having two or more radical polymerizable unsaturated groups in its single molecule and in the presence of a non-polymeric internal cross-linking agent (B) having in its single molecule two or more functional groups each of which allows formation of an ester bond or an amide bond by reacting with a carboxyl group so as to obtain a cross-linked polymer hydrogel; (ii) crushing the cross-linked polymer hydrogel obtained in the step (i); and (iii) drying crushed cross-linked polymer hydrogel products obtained in the step (ii), wherein: an amount of the internal cross-linking agent (A) is 0.01 mol % or more and 0.2 mol % or less relative to an amount of the unsaturated monomer containing a carboxyl group, and a molar ratio (B)/(A) of the internal cross-linking agent (A) and the non-polymeric internal cross-linking agent (B) is 0.01 or more and 1.8 or less. This makes it possible to produce a water absorbent resin that reduces an amount of fine powder even in a case where polymerization is carried out in the presence of a large amount of an internal cross-linking agent, in which method a cross-linked polymer hydrogel obtained by polymerization in the presence of the internal cross-linking agent is dried after being crushed in a crushing step to a size with which the hydrogel-linked polymer is easily dried.

Moreover, in a case where (B)/(A) is large, that is, in a case of using a large amount of internal cross-linking agent (B) to be reacted in a subsequent drying step, it is difficult to control an amount of the internal cross-linking agent (B) to be reacted in the drying step. This results in production of a water absorbent resin having a different degree of internal cross linking. Consequently, this varies Centrifugal retention Capacity (CRC) that is an indicator indicating an absorption capacity of the water absorbent resin obtained. The above arrangement that limits an amount of (B) with respect to (A) stabilizes the variation in CRC. As a result, it becomes possible to produce a water absorbent resin having a stable performance.

For a fuller understanding of the nature and advantages of the invention, reference should be made to the ensuing detailed description taken in conjunction with the accompanying drawings.

BEST MODE FOR CARRYING OUT THE INVENTION

Figure 1A:
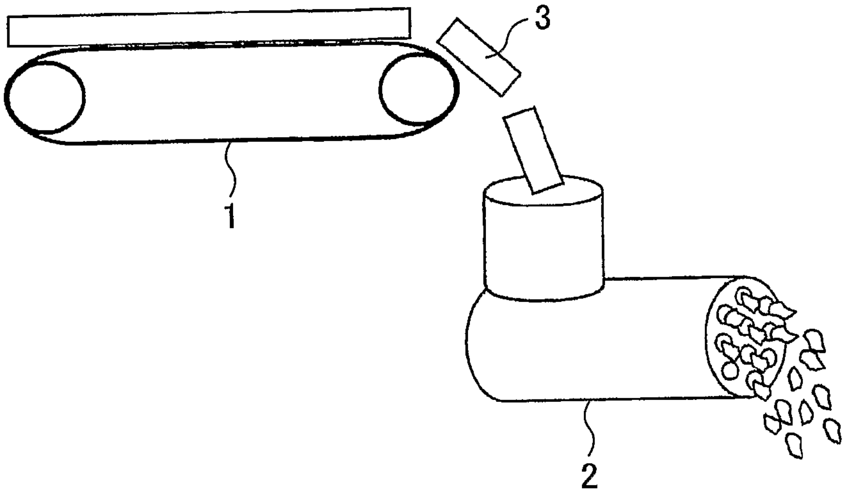
FIG. 1*a* is a drawing schematically illustrating a conventional method for producing a water absorbent resin in which method a cross-linked polymer hydrogel is crushed by a crusher after a monomer is polymerized without crushing.

The following describes a method for producing a water absorbent resin in accordance with the present invention. The following also describes the water absorbent resin and usage thereof. Respective values of (a) Centrifugal Retention Capacity (CRC), (b) particle diameter, and (c) logarithmic standard deviation ($\sigma\zeta$) of particle diameter distribution in the present invention are those measured with the methods described in the Examples below. In the present invention, "weight" is used as a synonym of "mass", and "weight %" is used as a synonym of "mass %".

(1) A Method for Producing a Water Absorbent Resin in Accordance with the Present Invention and the Usage Thereof The method for producing a water absorbent resin in accordance with the present invention includes the steps of: (i) polymerizing a monomer including an unsaturated monomer containing a carboxyl group, in the presence of an internal cross-linking agent (A) having two or more radical polymerizable unsaturated groups in its single molecule and in the presence of a non-polymeric internal cross-linking agent (B) having in its single molecule two or more functional groups each of which allows formation of an ester bond or an amide bond by reacting with a carboxyl group so as to obtain a cross-linked polymer hydrogel; (ii) crushing the cross-linked polymer hydrogel obtained in the step (i); and (iii) drying crushed cross-linked polymer hydrogel products obtained in the step (ii), wherein: an amount of the internal cross-linking agent (A) is 0.01 mol % or more and 0.2 mol % or less relative to an amount of the unsaturated monomer containing a carboxyl group, and a molar ratio (B)/(A) of the internal cross-linking agent (A) and the non-polymeric internal cross-linking agent (B) is 0.01 or more and 1.8 or less.

It is possible that the method of the present invention further include the step (iv) of mixing the water absorbent resin obtained in the step (iii) with a surface cross-linking agent and heating the mixture so as to cross-link the surface of the water absorbent resin.

Further, a method for producing a water absorbing agent containing a water absorbent resin and a liquid permeability improving agent by adding the liquid permeability improving agent to the water absorbent resin based on the method of the present invention is encompassed within the present invention. That is to say, the method for producing the water absorbing agent in accordance with the present invention may utilize the method for producing the water absorbent resin in accordance with the present invention and may include adding the liquid permeability improving agent to the water absorbent resin.

The following describes the method for producing the water absorbent resin in accordance with the present invention and the usage thereof. In the following description, (1-1) polymerizing, (1-2) crushing, (1-3) drying, (1-4) surface cross-linking, (1-5) use of the method for producing the water absorbent resin, and (1-6) other steps are discussed in this order as listed.

(1-1) Polymerizing

In this step, the cross-linked polymer hydrogel is obtained by polymerizing the monomer including the unsaturated monomer containing a carboxyl group in the presence of (i) the internal cross-linking agent (A) having at least two radical polymerizable unsaturated groups in its single molecule and (ii) the non-polymeric internal cross-linking agent (B) having in its single molecule at least two functional groups each of which allows formation of an ester bond or an amide bond by reacting with the carboxyl group.

<Method of Polymerization>

The method for polymerizing a monomer including an unsaturated monomer containing a carboxyl group in the present step is not particularly limited, and a publicly-known method is usable, such as aqueous polymerization, reversed-phase suspension polymerization, bulk polymerization, and precipitation polymerization. In view of properties of the water absorbent resin obtained, it is more preferable to carry out aqueous polymerization using the monomer including the unsaturated monomer containing a carboxyl group as the aqueous solution. If the monomer including the unsaturated monomer containing a carboxyl group is to be used as the aqueous solution, the concentration of the unsaturated monomer containing a carboxyl group in the aqueous solution (carboxyl-group-containing unsaturated monomer aqueous solution) is determined according to the temperature of the aqueous solution and the unsaturated monomer containing a carboxyl group. The concentration is not particularly limited. For example if the polymerization is to be carried out using the unsaturated monomer containing a carboxyl group which unsaturated monomer is neutralized in advance (neutralizing polymerization), it is preferable that the concentration be from 10 to 70 mass % inclusive, preferably from 20 to 60 mass % inclusive, and more preferably from 30 to 50 mass % inclusive. This makes it possible to suitably crush the cross-linked polymer hydrogel obtained. Further, it is also possible, if necessary, to concomitantly use a solvent other than water in the aqueous polymerization. The type of the solvent to be used concomitantly is not particularly limited.

Specifically, although the use of water alone as the polymerization solvent is preferable, it is also possible to use, if necessary, a hydrophilic organic solvent, such as methanol, ethanol, isopropanol, acetone, dimethyl formamide, and dimethylsulfoxide, by adding it to the water.

As described above, it is preferable to carry out aqueous polymerization in the present step, but methods thereof are not particularly limited. Static polymerization in which a monomer aqueous solution is polymerized in a static state without a stir, stirred polymerization in which a monomer is stirred in a reactor to be polymerized, and other methods of polymerization are adoptable. Note that in the method for producing the water absorbent resin in accordance with the present invention, the cross-linked polymer hydrogel obtained by polymerization in the presence of an internal cross-linking agent is crushed in the crushing step to size the cross-linked polymer hydrogel such that the cross-linked polymer hydrogel becomes easy to dry. Thereafter, the cross-linked polymer hydrogel is dried. Thus, no crushing is necessary in the present step. The present step may be arranged so that the produced cross-linked polymer hydrogel is crushed.

Static polymerization is preferable because it does not cause a problem that molecular chains are easily cut by shearing force arising from a stir. The static polymerization only needs to be a polymerization method in which no stir is substantially carried out between the time when polymerization starts and the time when a polymerization system reaches a highest reachable temperature owing to polymerization heat. Conventional publicly-known methods are usable suitably. The polymerization system here is a monomer aqueous solution and/or a cross-linked polymer hydrogel.

It is preferable in the static polymerization to use a device that can heat and/or cool down a surface being in contact with the polymerization system, and has a space allowing solvents to evaporate from the polymerization system. Examples of the polymerization device include: a conveyor-belt type polymerization device that can perform heating and/or cooling from a single surface of a lower part of a conveyor-belt; a heat exchanging plate type device that can perform heating and/or cooling from a single surface of a plate surface; and a centrifugal-film type polymerization device that can perform heating and/or cooling from a surrounding wall.

Further, the materials of the devices are not particularly limited. For example stainless steels, synthetic resins, ceramics and the like are usable suitably. Among those listed above, stainless steels are preferable as the materials of the devices in view of durability and heat transfer property. Further, in view of preventing the cross-linked polymer hydrogel from adhering, stainless steels with Teflon (registered trademark) adhered to the stainless steels are also usable suitably.

In the present invention, it is preferable that the temperature at the time of polymerization be from 0° C. to 120° C. as described below, although it depends on the type of the solvent that is to be used. Thus, if the static polymerization is to be adopted in the present step, heating and cooling are to be carried out such that the polymerization system is brought into the foregoing range.

Further, it is preferable that the thickness of the polymerization system (height of the monomer aqueous solution) be from 1 mm to 50 mm inclusive, preferably from 5 mm to 30 mm inclusive. The polymerization system having the thickness of 1 mm or more is preferable in view of productivity. The polymerization system having the thickness of 50 mm or less is preferable because this allows the temperature of the polymerization system to be controlled suitably.

Among the polymerization devices used in the static polymerization, the conveyor-belt type polymerization device is suitable because productivity is improvable by continuous processing. Concretely, an endless-belt or the like is usable suitably. The devices and polymerization methods described in Japanese Unexamined Patent Publication No. 2005-014183 (method using a device made of a specific fluorocarbon resin), Japanese Unexamined Patent Publication No. 2003-274121 (method including a specific polymerization stage), Japanese Unexamined Patent Publication No. 2005-086865 (method using a device having a specific percentage of void) and the like are also usable suitably.

Further, it is possible to use a single shaft agitator in a method for polymerizing a monomer concurrently with stirring the resultant cross-linked polymer hydrogel in a reactor, but an agitator having plural agitation shafts is more suitably usable.

In the present step, the following are usable as the initiator that is utilized to polymerize the monomer including the unsaturated monomer containing a carboxyl group: radical polymerization initiators such as potassium persulfate, ammonium persulfate, sodium persulfate, potassium peracetic, sodium peracetic, potassium percarbonate, sodium percarbonate, t-butylhydroperoxide, hydrogen peroxide, 2,2'-azobis(2-amidinopropane) dihydrochloride and the like; photopolymerization initiators such as 2-hydroxy-2-methyl-1-phenyl-propane-1-one and the like. The foregoing polymerization initiators are usable either alone or in combination of two or more types. Further, if a peroxide is to be used as the polymerization initiator, it is possible to carry out oxidation-reduction (redox) polymerization with the concomitant use of a reducing agent, such as sulfite, bisulfite, L-ascorbic acid and the like.

In view of properties of the water absorbent resin to be obtained, it is preferable that the usage of the polymerization initiator be from 0.001 mol % to 2 mol % inclusive, preferably from 0.01 mol % to 0.1 mol % inclusive, with respect to the whole monomer. The usage of the polymerization initiator of 0.001 mol % or above is preferable because this allows unreacted residual monomers to decrease sufficiently. Further, the usage of the polymerization initiator of 2 mol % or below is preferable because this allows the polymerization to be controlled suitably. The monomer here is (a) the unsaturated monomer containing a carboxyl group in a case where neither of the other monomer and the polymer for graft polymerization that are described below is to be used, or (b) the unsaturated monomer containing a carboxyl group and the other monomer or the polymer for graft polymerization, both of which are described below, in a case where the other monomer or the polymer for graft polymerization is to be used.

To initiate the polymerization, the polymerization initiator is usable. Besides the polymerization initiator, an active energy ray, such as ultraviolet rays, electron beams, and γ rays, is usable either alone or in combination with the polymerization initiator.

It is preferable that the temperature at the time of polymerization be from 0° C. to 120 C.° inclusive, preferably from 10 C.° to 100 C.° inclusive, and more preferably from 20° C. to 90 C.° inclusive, although it depends on the type of the solvent used. With the temperature of 120° C. or lower at the time of polymerization, only internal cross-linking by the internal cross-linking agent (A) proceeds in the present polymerization step, while a reaction of the functional group and the carboxyl group, which reaction occurs at a higher temperature and can form an ester bond or an amide bond as a result of reaction with the carboxyl group, does not occur substantially in the present polymerization step. It is thus possible to carry out the crushing in a state in which the degree of cross-linking of the cross-linked polymer hydrogel is low. This makes it possible to solve the problem of fine powder.

Further, a polymerization period is not particularly limited, but it is preferable that the polymerization period be from 30 seconds to 60 minutes inclusive, preferably from 2 minutes to 40 minutes inclusive. The polymerization period of 60 minutes or shorter is preferable because this makes it possible to avoid deterioration in properties of the water absorbent resin obtained. The polymerization period here implies a period from the time when the polymerization initiator is added to the monomer including the unsaturated monomer containing a carboxyl group to the time when the cross-linked polymer hydrogel is removed from the reactor device. It is preferable that an conversion rate of the monomer be 90% or above at the time when the cross-linked polymer hydrogel is removed from the reactor device, that is to say, at the end of the polymerization period.

Further, it is preferable that the percentage of a water content in the cross-linked polymer hydrogel obtained in the present step be from 10% to 70% inclusive, preferably from 20% to 60% inclusive. With the percentage of the water content falling within the foregoing ranges, it becomes possible to suitably carry out the crushing in the following step of crushing. Further, the percentage of the water content of 60% or below is preferable because this makes it possible to carry out the drying suitably without requiring much time to dry at the following step of drying.

Further, the shape of the cross-linked polymer hydrogel to be obtained in this step is not particularly limited. The cross-linked polymer hydrogel may be in any shape, including the shape of a thick plate, a block, a sheet, a particle and the like.

Further, the size of the cross-linked polymer hydrogel is not particularly limited, as long as it is possible to feed the cross-linked polymer hydrogel into a crushing machine in the following step of crushing. For example if the cross-linked polymer hydrogel is in the shape of a thick plate or a sheet, it is preferable that the thickness of the cross-linked polymer hydrogel be from 1 mm to 5 cm inclusive. The thickness of 1 mm or more is preferable because the polymer becomes easy to peel off from a belt or the like and excellent in productivity. The thickness of 5 cm or less is preferable because this facilitates crushing in the following step. Further, if the cross-linked polymer hydrogel is in the shape of a particle, it is preferable that the average particle diameter be in the range of 0.1 mm to 5 mm, preferably in the range of 0.5 mm to 3 mm.

In the present step, it is possible to use a chain transfer agent if necessary. This makes it possible to obtain a water absorbent resin having high absorption power and excellent stability against urine.

The chain transfer agent is not particularly limited, as long as it is soluble in water or monomer, and examples thereof include thiols, thiol acids, secondary alcohols, amines, and hypophosphites. Concretely, one or more than one type of chain transfer agent selected from the group consisting of mercaptoethanol, mercaptopropanol, dodecylmercaptan, thioglycols, thiomalic acid, 3-mercaptopropionic acid, isopropanol, sodium hypophosphate, formic acid, and their salts is used. Use of a hypophosphite such as a sodium hypophosphite is preferable in view of the effect to be produced thereby.

The usage of the chain transfer agent is from 0.001 mol % to 1 mol % inclusive with respect to the whole monomer, preferably from 0.005 mol % to 0.3 mol % inclusive, although it depends on the type and the usage of the chain transfer agent and the concentration of the monomer in the monomer aqueous solution. The usage of 0.001 mol % or more is preferable because this does not cause the centrifugal retention capacity to become too low. Further, the usage of 1 mol % or less is preferable because this causes neither increase in the extractable polymer content nor decrease in stability.

<Unsaturated Monomer Containing a Carboxyl Group>

In view of water absorption property, the water absorbent resin obtained by polymerizing the monomer including the unsaturated monomer containing a carboxyl group is produced in the present invention. Further, the unsaturated monomer containing a carboxyl group serves also as a monomer containing a group which becomes a carboxyl group such as an acrylic nitrile after polymerization, as a result of hydrolysis carried out after the polymerization in the present invention. Use of the unsaturated monomer containing a carboxyl group at the time of polymerization is more preferable.

Examples of the unsaturated monomer containing a carboxyl group at the time of polymerization include (meth) acrylic acid, maleic acid anhydride, maleic acid, fumaric acid, crotonic acid, itaconic acid, cinnamic acid, β-acryloyloxypropionic acid, and their alkali metal salts, alkaline earth metal salts, ammonium salts, and alkylamine salts. The unsaturated monomers containing carboxyl groups are usable either alone or in the form of a mixture of two or more types.

Among the above-listed unsaturated monomers containing carboxyl groups, the monomer containing the acrylate or similar monomer as a main ingredient is preferable because the use thereof allows further improvements in water absorption property or safety of the water absorbent resin obtained. The acrylate monomer is an acrylic acid and/or a water-soluble salt of the acrylic acids.

Further, the water-soluble salt of the acrylic acids is alkali metal salts, alkaline earth metal salts, ammonium salts, hydroxyammonium salts, amine salts, or alkylamine salts of the acrylic acids, with the rate of neutralization in the range of 100 mol % to 0.1 mol %, preferably in the range of 90 mol % to 50 mol %, more preferably in the range of 80 mol % to 60 mol %. The alkali metal salt is preferable, and the sodium salt and the potassium salt are especially preferable, among the water-soluble salts listed above. It is possible to carry out neutralization of the carboxyl group to form the salts, either in the state of a monomer before the polymerization, or in the state of a polymer during or after the polymerization. It is also possible to carry out the neutralization by combining them. A rate of neutralization of the carboxyl group in the water absorbent resin is calculable on the basis of the amount of unneutralized unsaturated monomer containing a carboxyl group and the total amount of bases used in neutralization before, during, and/or after the polymerization. The rate is also obtainable by extracting the soluble part of the water absorbent resin and then titrating.

The acrylate or similar monomer is usable either alone or in combination of two or more types. The average molecular weight (degree of polymerization) of the water absorbent resin is not particularly limited.

In the present step, it is possible to copolymerize other monomer in combination with the unsaturated monomer containing a carboxyl group, to the extent that the effect of the present invention is not to be inhibited.

Other concrete examples of the monomers to be used in combination include: (meth) acrylic acid esters such as methyl(meth)acrylate, ethyl(meth)acrylate, and buthyl(meth) acrylate; hydrophobic monomers such as vinyl acetate and vinyl propionate; acid group containing monomer, such as 2-(meth)acryloylethane sulfonic acid, 2-(meth) acryloylpropanesulfonic acid, 2-(meth)acrylamide-2-methylpropanesulfonic acid, vinyl sulfonic acid, styrenesulfonic acid, allylsulfonic acid, vinylphosphonic acid, 2-(meth) acryloyloxyethylphosphoric acid, (meth)acryloxyalkanesulfonic acid, and their alkali metal salts, alkaline earth metal salts, ammonium salts, and alkylamine salts; dialkylaminoalkyl(meth)acrylates such as N,N-dimethylaminoethyl (meth)acrylate, N,N-dimethylaminopropyl(meth)acrylate, and N,N-dimethylaminopropyl(meth)acrylamide and quaternized products thereof (e.g. reactant with alkylhydride, reactant with dialkyl sulfuric acid); dialkylaminohydroxyalkyl (meth)acrylates and quaternized products thereof; hydroxyalkyl(meth)acrylates, such as hydroxymethyl(meth) acrylate, 2-hydroxyethylmethacrylate, and 2-hydroxypropyl (meth)acrylate; acrylamide, methacrylamide, N-ethyl(meth) acrylamide, N-n-propyl(meth)acrylamide, N-isopropyl (meth)acrylamide, N,N-dimethyl(meth)acrylamide; and alkoxypolyethyleneglycol(meth)acrylate, such as methoxypolyethyleneglycol(meth)acrylate and polyethyleneglycolmono(meth)acrylate. The foregoing copolymerizing monomers are usable either alone or in the form of a mixture of two or more types.

In the present step, it is possible to polymerize the unsaturated monomer containing a carboxyl group with the polymer for graft polymerization such as polyvinyl alcohol, starch, and cellulose ether, to the extent that the effect of the present invention is not to be inhibited.

If the foregoing other monomer and/or polymer for graft polymerization are to be used, the respective usages are preferably 0 to 50 mol %, more preferably 0 to 30 mol %, still more preferably 0 to 10 mol %, particularly preferably 0 to 5 mol %, most preferably 0 to 1 mol %, with respect to the total amount of the other monomer and/or polymer for graft polymerization and the unsaturated monomer containing a carboxyl group in which unsaturated monomer is used as a main ingredient. This further improves water absorption properties of the finally obtained water absorbent resin and the final water absorbing agent.

<Internal Cross-Linking Agent>

An internal cross-linking agent (A) for use in the present invention only needs to be an internal cross-linking agent having at least two radical polymerizable unsaturated groups in its single molecule. The internal cross-linking agent (A) is polymerized simultaneously under conditions where the monomer including the unsaturated monomer containing a carboxyl group is polymerized, so that an internal cross-link is formed by the internal cross-linking agent (A).

Specific examples of the internal cross-linking agent (A) having at least two radical polymerizable unsaturated groups in its single molecule include N,N'-methylene bis(meth) acrylamide, (poly) ethylene glycol di(meth)acrylate, (poly) propylene glycol di(meth)acrylate, trimethylolpropane tri (meth)acrylate, trimethylolpropane di(meth)acrylate, glycerin tri(meth)acrylate, glycerin acrylate methacrylate, ethylene oxide modified trimethylolpropane tri(meth)acrylate, pentaerythritol tetra(meth)acrylate, pentaerythritol hexa(meth)acrylate, triallyl cyanurate, triallyl isocyanurate, triallyl phosphate, triallyl amine, poly(meth)allyloxyalkane, N,N'-diallyl acrylamide, diallyloxy acetic acid, and bis(N-vinyl carboxylic amide). These internal cross-linking agents (A) may be used separately, or two or more of them may be appropriately used in combination.

Above all, it is preferable that the internal cross-linking agent (A) has an ethyleneoxide chain in its molecule, and it is particularly preferable that the internal cross-linking agent (A) is polyethylene glycol di(meth)acrylate.

Further, an internal cross-linking agent (B) for use in the present invention is a non-polymeric internal cross-linking agent having in its single molecule at least two functional groups each of which allows formation of an ester bond or an amide bond by reacting with a carboxyl group. Examples of the functional groups include not only a functional group that forms an ester bond or an amide bond with a carboxyl group, but also a functional group that does not form an ester bond or an amide bond directly with a carboxyl group but forms an ester bond or an amide bond as a result of reacting with a carboxyl group. Examples of such internal cross-linking agent (B) include an internal cross-linking agent that is decarbonated by heating so as to have functional groups which form an ester bond or an amide bond with a carboxyl group.

Figure 1B:
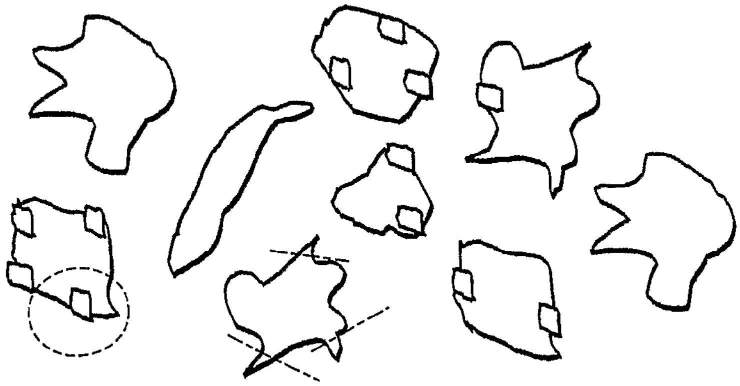
FIG. 1*b* is a diagram schematically illustrating a crushed cross-linked polymer hydrogel obtained by a conventional method for producing a water absorbent resin.

In case where an internal cross-linking agent (B) having such functional groups is used, the functional groups react with a carboxyl group within a temperature range higher than the temperature range of the polymerization reaction of the monomer including the unsaturated monomer containing a carboxyl group. For this reason, in the present polymerizing step, no internal cross-link is substantially formed by the internal cross-linking agent (B). Therefore, in the present polymerizing step, the resulting cross-linked polymer hydrogel can be prevented from becoming too hard. Accordingly, in the subsequent crushing step, crushed cross-linked polymer hydrogel, shown in FIG. 1*b*, which have microparticles adhering to relatively large particles or which have pointed end can be prevented from being generated. This makes it possible to decrease the amount of fine powder that is generated by pointed end and microparticles removed due to friction between water absorbent resin particles or due to impact by pneumatic transportation in a step subsequent to the drying step. Furthermore, in addition to this, an internal cross-link can be formed by the internal cross-linking agent (B) by carrying out heating in the drying step, so that a desired degree of cross-linking can be achieved.

Therefore, it is preferable that the functional groups of the internal cross-linking agent (B) react with a carboxyl group at a temperature of not less than 110° C., more preferably at a temperature of not less than 130° C., still more preferably at a temperature of not less 150° C., or particularly preferably at a temperature of 180° C. This prevents the internal cross-linking agent (B) from substantially forming an internal cross-link in the polymerizing step in which the polymerization reaction proceeds at a temperature of less than 110° C., thereby bringing about an effect of the present invention. In order to prevent the functional groups from reacting with the carboxyl group in the polymerizing step, it is preferable that the temperature at which the functional groups react with the carboxyl group be higher. However, it is preferable that the temperature at which the functional 20, groups react with the carboxyl group be less than 300° C. The reason for this is as follows: When the internal cross-linking agent (B) forms a cross-link as a result of the reaction of the functional groups with the carboxyl group at a temperature of less than 300° C., the physical properties of the water absorbent resin can be prevented from deteriorating due to high temperatures.

Further, the internal cross-linking agent (B) only needs to have in its single molecule at least two functional groups each of which allows formation of an ester bond or an amide bond with a carboxyl group. However, it is more preferable that the internal cross-linking agent (B) have two or three such functional groups. With this, as compared with a case where the internal cross-linking agent (B) has four or more such functional groups, the points of cross-linking are dispersed and the distribution of cross-links is uniform. Further, it is still more preferable that the internal cross-linking agent (B) have in its single molecule two functional groups each of which allows formation of an ester bond or an amide bond with a carboxyl group. With this, high reactivity and high efficiency in reaction are achieved.

Further, "non-polymeric" in the present invention means compounds other than polymer compounds. The term "polymer compound" here means a compound which is obtained by polymerization or naturally occurs, which has repeated identical structural parts, and which has a molecular weight (weight-average molecular weight) of greater than 5000. The internal cross-linking agent (B) only needs to be non-polymeric. However, it is more preferable that the internal cross-linking agent (B) have a molecular weight of not less than 40 and not more than 500, still more preferably not less than 50 and not more than 250, or particularly preferably not less than 60 and not more than 100. In case where the internal cross-linking agent (B) is non-polymeric, as compared with a case where a polymer compound such as polyvinyl alcohol or starch is used as an internal cross-linking agent, high efficiency in cross-linking and uniform cross-linking are achieved. Furthermore, in case where the internal cross-linking agent (B) is non-polymeric, as compared with a case where a polymer compound is used as an internal cross-linking agent, the internal cross-linking agent (B) will not be easily colored when dried.

Examples of the functional groups capable of forming an ester bond or an amide bond by reacting with a carboxyl group include, but are not limited to, a hydroxyl group, an amino group, cyclocarbonate, oxazolidinone, imidazolidinone, a cyclic urethane group, a cyclic urea group, and an oxetane group.

Therefore, examples of the internal cross-linking agent (B) include: an internal cross-linking agent having one type of functional group selected from the functional groups exemplified above and having two or more such functional groups; and an internal cross-linking agent having two or more types of functional group selected from the functional groups exemplified above and having a total of two or more such functional groups. Among them, it is more preferable that the internal cross-linking agent (B) be an internal cross-linking agent having two or more hydroxyl groups. In case where the internal cross-linking agent (B) is an internal cross-linking agent having plural types of functional group, the ratio of one type of functional group to another type of functional group is not particularly limited.

Further, among the hydroxyl groups, it is more preferable that the internal cross-linking agent (B) be an internal cross-linking agent having a hydroxyl group bonded to primary carbon. With this, as compared with a hydroxyl group bonded to secondary or tertiary carbon, excellent reactivity is achieved.

Specific examples of the internal cross-linking agent (B) having in its single molecule at least two functional groups each of which allows formation of an ester bond or an amide bond by reacting with a carboxyl group include: polyhydric alcohol compounds such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentadiol, polypropylene glycol, (poly)glycerin, 2-butane-1,4-diol, 1,3-butanediol, 1,4-butanediol, 1,5-pentanediol, 1,6-hexanediol, 1,2-cyclohexane dimethanol, 1,2-cyclohexanol, trimethylol propane, diethanol amine, triethanol amine, polyoxypropylene, oxyethylene-oxypropylene block copolymer, pentaerithritol, erithritol, and sorbitol; polyamine compounds such as ethylenediamine, diethylenetriamine, triethylenetetramine, tetraethylenepentamine, pentaethylenehexamine, polyamide-polyamine, and polyethyleneimine; alkylene carbonate compounds such as 1,3-dioxolan-2-on, 4-methyl-1,3-dioxolan-2-on, 4,5-dimethyl-1,3-dioxolan-2-on, 4,4-dimethyl-1,3-dioxolan-2-on, 4-ethyl-1,3-dioxolan-2-on, 4-hydroxymethyl-1,3-dioxolan-2-on, 1,3-dioxane-2-on, 4-methyl-1,3-dioxane-2-on, 4,6-dimethyl-1,3-dioxane-2-on, and 1,3-dioxopane-2-on; oxazolidinone; imidazolidinone; polyisocyanate compounds such as 2,4-tolylenediisocyanate and hexamethylenediisocyanate; polyoxazoline compounds such as 1,2-ethylenebisoxazoline; and oxetane compounds such as 3-methyl-3-oxetanemethanol, 3-ethyl-3-oxetanemethanol, 3-butyl-3-oxetanemethanol, 3-methyl-3-oxetaneethanol, 3-ethyl-3-oxetaneethanol, 3-butyl-3-oxetaneethanol, 3-chloromethyl-3-methyloxetane, 3-chloromethyl-3-ethyloxetane, and multivalent oxetane compounds. These internal cross-linking agents (B) may be used separately, or two or more of them may be appropriately used in combination.

Above all, it is more preferable that the internal cross-linking agent (B) is polyol, and it is more preferable that the internal cross-linking agent (B) is polyol having one or more primary hydroxyl groups in its single molecule, more preferably, two or more primary hydroxyl groups in its single molecule.

Further, in view of the mixture with the monomer, it is preferable that the internal cross-linking agent (B) is in a liquid state at 25° C. and its boiling point is 150° C. or higher, more preferably 200° C. or higher, at $1.01325 \times 10^5$ Pa.

More preferable specific examples of the internal cross-linking agent (B) include multivalent alcohol compounds such as 1,4-butanediol, 1,3-propanediol, glycerin, propyleneglycol, 1,5-pentanediol, 1,6-hexanediol; sugar alcohol compound such as pentaerithritol, erithritol, and sorbitol. Above all, the internal cross-linking agent (B) is more preferably 1,4-butanediol, 1,3-propanediol, glycerin, or propyleneglycol, particularly preferably 1,4-butanediol.

Use of the internal cross-linking agent (B) exhibits high effect as an internal cross-linking agent, so that higher performance of the water absorbent resin is expected. Further, this arrangement is preferable since it is possible to prevent the water absorbent resin from being colored by heating.

Further, for the purpose of ease of addition and formation of a uniform cross-link, it is preferable that the internal cross-linking agent (B) be a water-soluble cross-linking agent that dissolves in 100 g of purified water by an amount of not less than 0.1 g.

In addition, the internal cross-linking agent (B) has a functional group equivalent weight preferably from 29 to 200, inclusive, and more preferably from 35 to 60, inclusive. The functional group equivalent weight is a value obtained by diving the molecular weight of the internal cross-linking agent (B) by the number of functional groups, in the internal cross-linking agent (B), which can react with a carboxyl group to form an ester bond or an amide bond. The functional group equivalent weight from 29 to 200, inclusive, is preferred because of resultant efficient internal cross-linking.

The internal cross-linking agent (B) may have some of its functional groups being modified provided that there remain in the agent (B) two or more free functional groups which can react with a carboxyl group to form an ester bond or an amide bond. In view of hydrophilicity, physical properties, safety, and coloring after heat treatment, the internal cross-linking agent (B) preferably has none of its functional groups being modified.

The internal cross-linking agent (A) is used in an amount of 0.01 mol % to 0.2 mol %, inclusive, relative to the unsaturated monomer containing a carboxyl group in the present invention.

The use of the internal cross-linking agent (A) at an amount of 0.01 mol % or greater relative to the unsaturated monomer containing a carboxyl group allows adjustment of the ratio of the internal cross-linking agents (B) and (A). That enables reduction of the usage of the internal cross-linking agent (B), which in turn solves the problem of unstable CRC of the dried water absorbent resin. In addition, the use of the internal cross-linking agent (A) at an amount of 0.2 mol % or lower relative to the unsaturated monomer containing a carboxyl group prevents the degree of internal cross-linking in the polymerization step from getting too high. Therefore, the resultant cross-linked polymer hydrogel is a soft gel, and the later crushing step is prevented to some degree from yielding crushed, relatively large particles with microparticles attached to them and also from yielding crushed articles with pointed end shown by a dash-dot line. Accordingly, the amount of fine powder is reduced which could be generated in the steps after the subsequent drying step from water absorbent resin particles as pointed ends break off or the attached microparticles go off as a result of the particles being scraped with each other due to friction or being subjected to impact in pneumatic transportation.

The internal cross-linking agent (A) is used in an amount of, preferably, 0.02 mol % to 0.15 mol %, inclusive, and more preferably, 0.03 mol % to 0.1 mol %, inclusive, in view of the balance between the amount of water absorbed and the extractable polymer.

The internal cross-linking agents (A) and (B) are used in the present invention so that the molar ratio (B)/(A) of the internal cross-linking agent (A) and the internal cross-linking agent (B) is from 0.01 to 1.8, inclusive. The ratio (B)/(A) of 0.01 or greater enables formation of an internal cross-linked structure that is overall sufficient while keeping a low degree of cross-linking through the polymerization step and the crushing step. In addition, the ratio (B)/(A) of 1.8 or lower reduces the usage of the internal cross-linking agent (B), which in turn solves the problem of unstable CRC of the dried water absorbent resin.

In the conventional technique of using a fixed-rate combination of internal cross-linking agents (i.e., an internal cross-linking agent having at least two or more radical polymerizable unsaturated groups in its single molecule and an internal cross-linking agent having at least two or more functional groups which can react with a carboxyl group per molecule), the latter agent, which is more cost effective, is often used more in increasing the usage of the internal cross-linking agent mainly in order to reduce the water absorption rate. In Patent Documents 2 to 6, the latter is actually used in at least double the amount (molar ratio) of the former. Conventionally it has not been recognized that such high molar ratios (B)/(A) of the internal cross-linking agents (A) and (B) could be a cause of inconvenience.

The inventors have identified that the production method of the present invention not only achieves the object of preparing a water absorbent resin while producing a reduced amount of fine powder even when polymerization is carried out in a region where the internal cross-linking agent(s) abounds, but also mitigates CRC irregularities of obtained water absorbent resins.

If the molar ratio (B)/(A) of the internal cross-linking agents (A) and (B) is as low as from 0.01 to 1.8, inclusive, the CRC irregularities are mitigated for the following reasons. If the molar ratio (B)/(A) of the internal cross-linking agents (A) and (B) is high, the internal cross-linking agent (B), which will react in a later drying step, is present in a relatively large amount, and it would be very difficult to control how much of the internal cross-linking agent (B) will react in the drying step. If the reaction of the internal cross-linking agent (B) cannot be controlled, the resultant water absorbent resin shows an inconsistent degree of internal cross-linking, hence inconsistent water absorbing capability. For these reasons, when the internal cross-linking agents (A) and (B) are used together, if the internal cross-linking agent (B), which will react in a later drying step, is used in such an amount that (B)/(A) is 1.8 or lower, the resultant water absorbent resin shows more consistent CRC.

The internal cross-linking agents (A) and (B) only need to be present in the polymerization of the monomer including the unsaturated monomer containing a carboxyl group. The agents (A) and (B) may be added before the polymerization of the monomer or during the polymerization. The agents (A) and (B) may be added at once or separately to the reaction system.

(1-2) Crushing Step

In the present step, the cross-linked polymer hydrogel obtained in the polymerization step is crushed. In the method for producing a water absorbent resin in accordance with the present invention, the cross-linked polymer hydrogel obtained in the polymerization step is dried after it is crushed in the crushing step.

The "crushing" in the present invention is defined as a process of making small particles from the cross-linked polymer hydrogel obtained in the polymerization step so that the polymer can be readily dried in the drying step. More specifically, the crushed cross-linked polymer hydrogel, that is, the crushed articles of the cross-linked polymer hydrogel, is better if it contains a smaller amount of large pieces of gel which will remain undried under typical drying conditions. The crushed articles of the cross-linked polymer hydrogel has an average particle diameter of preferably 0.1 mm to 5 mm, inclusive, and more preferably 0.5 mm to 3 mm, inclusive. Particles with a diameter of 5 mm or greater account for preferably 10 weight % or less, and more preferably 5 weight % or less, of the whole cross-linked polymer hydrogel. Either the diameter or average diameter of the particles of the cross-linked polymer hydrogel preferably falls in the above range because of accompanying high drying efficiency. The diameters of the cross-linked polymer hydrogel particles are determined by classification using sieves having particular openings, similarly to the diameters of pulverized water absorbent resin particles (measured by the method described later under the heading "(b) Particle Diameter"). The average diameter of particles is also determined similarly to D50 (detailed later). Note however that the average diameter is measured by the wet classification method described in paragraph [0091] of Japanese Unexamined Patent Publication (Tokukai) 2000-63527 because the cross-linked polymer hydrogel is difficult to classify by a dry method.

In the present invention, "crushing" is distinguished from "pulverization" in which the dried product obtained by drying the crushed cross-linked polymer hydrogel are further comminuted to yield an end product.

Any method may be used in the present step so long as it is a method of crushing the cross-linked polymer hydrogel. Use of a crusher is preferred.

The crusher is not limited in any particular manner. A suitable crusher can be selected according to the type, water content, size, shape, etc. of the cross-linked polymer hydrogel. Examples of crusher usable for the present step include crushers of meat chopper types, slitters with a cutter blade, and impact-type crushers. The cut and shear mill described in Japanese Unexamined Patent Publication (Tokukai) 2002-212204 is also preferably used in the present step.

Particularly preferred among the examples is the crusher of a meat chopper type because it is less expensive, more compact, and easier to install than other types of crushers. The meat-chopper-type crusher is not limited in any particular manner so long as it is a crusher which crushes the cross-linked polymer hydrogel by extruding it out through a porous plate. When this type of crusher is used, the cross-linked polymer hydrogel is crushed into crushed particulate articles of the cross-linked polymer hydrogel as it is extruded through a porous plate. The extrusion mechanism is not limited in any particular manner so long as it is capable of transporting the cross-linked polymer hydrogel from the supply port to the porous plate of the crusher by squeezing. Examples include use of screws or rotary rolls. The meat-chopper-type crusher equipped with screws as an extrusion mechanism may have a single axis or plural axes so long as the screws are provided to rotate inside the cylinder. It is possible to use crushers which are generally used to mold rubber or plastic by extrusion or a crusher used as a comminutor.

The holes of the porous plate has a diameter preferably from 6.5 mm to 18 mm, inclusive, and more preferably from 8 mm to 15 mm, inclusive. The hole diameter of 6.5 mm or greater is preferred because the setting does not cause decrease in productivity which is attributable to friction between the surfaces of the wall of the crusher and the cross-linked polymer hydrogel under excessively stringent crush conditions or degradation of physical properties of the cross-linked polymer hydrogel. The hole diameter of 18 mm or smaller is preferred because the setting produces crushed articles of the cross-linked polymer hydrogel with particle diameters within a particular range.

The porous plate may have any aperture ratio. It is however preferably from 25% to 90%, inclusive, and more preferably from 30% to 90%, inclusive. The aperture ratio of 25% or greater is preferred because the setting prevents decrease in productivity which is attributable to the difficulty in extruding the cross-linked polymer hydrogel. The aperture ratio is the sum of hole areas divided by the total area of the porous plate.

In some cases, the porous plate is preferably equipped with a cutter which operates substantially in contact with the internal surface of the plate. When that is the case, the crushed articles of the cross-linked polymer hydrogel are obtained with invariably small particle diameters.

In the present step, the devices and crushing methods described in Japanese Unexamined Patent Publication 5-70597/1993 (Tokukaihei 5-70597; method of extrusion through a porous plate having a particular hole diameter), Japanese Unexamined Patent Publication (Tokukai) 2000-63527 (method using a screw-type extruder equipped with a reverse flow prevention member), Japanese Unexamined Patent Publication (Tokukai) 2004-128299 (method of crushing in added water using a screw extruder), EP327443B (method of crushing using a gel cutter) can be preferably used.

When a meat-chopper-type crusher is used, the cross-linked polymer hydrogel in the crusher is crushed preferably at 45° C. to 100° C., inclusive, and more preferably at 50° C. to 90° C., inclusive. The temperature of the cross-linked polymer hydrogel in the crusher of 45° C. or higher is preferred because the setting prevents degradation of the water absorbing characteristic of the water absorbent resin due to excessive shearing force acting on the cross-linked polymer hydrogel. By setting the temperature of the cross-linked polymer hydrogel in the crusher to 90° C. or lower, the functional groups which can react with a carboxyl group to form an ester bond or an amide bond in the internal cross-linking agent (B) in practice does not react with carboxyl groups in the crushing step. Therefore, the crushing can be done on the cross-linked polymer hydrogel with a low degree of cross-linking. That solves the problems of fine powder.

The water content of the crushed articles of the cross-linked polymer hydrogel obtained in the present step is preferably from 10% to 70%, inclusive, and more preferably from 20% to 60%, inclusive. Setting the water content within this range is preferably because of good crushing achieved in the crushing step. In addition, setting the water content to 60% or less preferably because the successive, drying step will not take excessive time and achieves good drying.

In the present step, water may be added in the crushing step. Accordingly, the water uniformly disperses crushed articles and makes them less likely to stick. The water may be added at the same time as the cross-linked polymer hydrogel is fed to the crusher or during the crushing. The water may be added continuously or intermittently. Preferably, the water is added continuously. The amount of water added per 100 parts by weight of the cross-linked polymer hydrogel is preferably from 0.1 parts by weight to 30 parts by weight, inclusive, and more preferably from 0.5 parts by weight to 20 parts by weight, inclusive. Adding water in an amount within these ranges produces expected results. The water may be added either in liquid form or as water vapor.

(1-3) Drying Step

In the present step, the crushed cross-linked polymer hydrogel obtained in the crushing step is dried so as to be a dried product having a water content falling within a predetermined range.

A drying method for use in the present step is not particularly limited as long as it is such a method that the temperature of the material in the drying step (crushed cross-linked polymer hydrogel being dried) is not less than 110° C. Examples of the drying method include various methods such as drying by heating, hot-air drying, drying under reduced pressure, infrared drying, microwave drying, dehydration by azeotropic distillation with a hydrophobic organic solvent, and high humidity drying with use of hot vapor.

Examples of a dryer for use in the present step include: box dryers; drum dryers; and band dryers such as parallel flow band-tunnel dryers and ventilation band dryers.

The drying step is normally carried out at a drying temperature of not less than 110° C., preferably not less than 130° C., more preferably not less than 150° C., or still more preferably not less than 180° C.

Drying the cross-linked polymer hydrogel at a drying temperature of not less than 110° C. makes it possible to cause an internal cross-linking reaction by the internal cross-linking agent (B) which did not react with a carboxyl group within the temperature range of the polymerizing step. Therefore, also in case where the degree of internal cross-linking at the time of polymerization and at the time of crushing is lowered by reducing the amount of internal cross-linking agent that reacts at the polymerization temperature, it becomes possible to obtain a highly cross-linked water absorbent resin by developing internal cross-linking in the drying step.

Further, it is preferable that the drying temperature normally have au upper limit of less than 300° C., more preferably less than 250° C., or still more preferably less than 220° C. Drying the cross-linked polymer hydrogel at a drying temperature of less than 300° C. makes it possible to prevent the resulting water absorbent resin from being colored. The “drying temperature” is here defined by the temperature of a heat medium in case where oil or vapor is used as a heat medium, or defined by the temperature of the material (cross-linked polymer hydrogel being dried) in case where the cross-linked polymer hydrogel is dried without use of a heat medium (e.g., with use of irradiation of electron beams). Further, in this step, the drying temperature may be gradually changed.

Further, the drying period depends on the surface area of the cross-linked polymer hydrogel, the water content of the cross-linked polymer hydrogel, and the type of dryer, and may be selected so that a desired water content is achieved. For example, the drying period preferably ranges from 10 minutes to 120 minute, or more preferably from 30 minutes to 60 minutes. The resulting dried product is a water absorbent resin of the present invention.

Further, the water absorbent resin of the present invention encompasses not only the dried product obtained by drying the cross-linked polymer hydrogel in the drying step, but also encompasses a surface cross-linked water absorbent resin in case where the below-mentioned surface cross-linking is performed and encompasses pulverized and classified final products obtained by pulverizing and classifying the surface cross-linked water absorbent resin.

The water content of the water absorbent resin obtained by the drying step is not particularly limited. However, it is preferable the water absorbent resin be particles (powder) that exhibit(s) fluidity even at room temperature. It is more preferable that the water absorbent resin take the form of a powder having a water content of 0.2 mass % to 30 mass %, still more preferably 0.3 mass % to 15 mass %, or especially preferably 0.5 mass % to 10 mass %. When the water content is not less than the upper limit of the range, the water absorbent resin has such good fluidity as to be suitably used for producing products without problems.

Further, it is preferable that the drying step be carried out so that the amount of residual internal cross-linking agent (B) contained in the water absorbent resin obtained in the drying step is not more than $1.0\times10^{-5}$ mol/g. The water absorbent resin obtained after the drying step may contain such a residual unreacted internal cross-linking agent (B) that none of the functional groups contained in the single molecule of the internal cross-linking agent (B) having the functional groups each of which allows formation of a covalent bond with a carboxyl group has formed any bond with a carboxyl group of the water absorbent resin. The amount of residual internal cross-linking agent (B) refers to the amount of unreacted internal cross-linking agent (B) contained in the water absorbent resin. The amount of residual cross-linking agent (B) contained in the water absorbent resin can be measured by a method described in (2).

By performing drying such that the amount of residual internal cross-linking agent (B) contained in the water absorbent resin obtained in the drying step is not more than $1.0\times10^{-5}$ mol/g, the internal cross-linking agent (B) used involves efficiently in internal cross-linking, so that desired water absorption properties are obtained.

After the drying step, the centrifugal retention capacity (CRC) of the water absorbent resin which has not been subjected to the surface cross-linking step is preferably 28 g/g or more, more preferably 33 g/g or more, still more preferably 34 g/g or more, particularly preferably 36 g/g or more. Note that, an upper limit of the centrifugal retention capacity (CRC) of the water absorbent resin after the drying step and before the surface cross-linking step is preferably 50 g/g or less.

By setting the CRC of the water absorbent resin after the drying step and before the surface cross-linking step into the foregoing range, it is possible to reduce an amount of fine powder of the final product and it is possible to stabilize the CRC after the drying step.

A shape of the water absorbent resin obtained by such a producing method of the present invention as described above is not limited as long as the water absorbent resin can be treated as a powder. The shape of the water absorbent resin may be a spherical shape, a fibrous shape, a rod-like shape, a substantially spherical shape, a flat shape, an indeterminate shape, a granular shape, the shape of particles having porous structures, or the like. However, an indeterminate pulverized shape is preferable.

(1-4) Surface Cross-Linking Step

In view of the physical properties of the water absorbent resin that will be produced, the method for producing a water absorbent resin in accordance with the present invention preferably involves a surface cross-linking step of mixing the water absorbent resin (dried product) obtained in the drying step with a surface cross-linking agent and heating the mixture to form surface cross-linking.

The surface cross-linking step reduces the centrifugal retention capacity (CRC) of the water absorbent resin by preferably 3 g/g or more, more preferably 5 g/g or more, to at least 26 g/g. The maximum reduction of the centrifugal retention capacity (CRC) upon the surface cross-linking is 50% the pre-cross-linking centrifugal retention capacity (CRC). The 3 g/g or greater reduction of the centrifugal retention capacity (CRC) of the water absorbent resin is preferable because that yields sufficient surface cross-linking strength. The resultant centrifugal retention capacity (CRC) of 26 g/g or more is preferable because that ensures sufficient water absorbing capacity.

The surface cross-linking step preferably renders $0.1\times10^{-5}$ mol/g or less the amount of the internal cross-linking agent (B) remaining in the water absorbent resin. The water absorbent resin after the surface cross-linking may contain an unreacted amount of the internal cross-linking agent (B) in which none of the functional groups of the molecules of the internal cross-linking agent (B), which potentially could form covalent bonds with a carboxyl group, is bonded to a carboxyl group of the water absorbent resin. The amount of the internal cross-linking agent (B) remaining in the water absorbent resin refers to the unreacted amount of the internal cross-linking agent (B) in the water absorbent resin.

That particular amount of the internal cross-linking agent (B) remaining in the water absorbent resin after the surface cross-linking is preferable because the amount enables the internal cross-linking agent (B) that remains unreacted after the drying step to further perform internal cross-linking in a present step and be consumed more efficiently in the internal cross-linking to yield the desired water absorbing characteristics.

Various surface cross-linking agents can be used in the present step. Examples in view of physical properties include polyhydric alcohol compounds, epoxy compounds, polyamine compounds, condensates of polyamine compounds with haloepoxy compounds, oxazoline compounds, monooxazolidinone compounds, dioxazolidinone compounds, polyoxazolidinone compounds, polyvalent metal salts, and alkylene carbonate compounds. Specifically, the surface cross-linking agents described as examples in the specifications of U.S. Pat. Nos. 6,228,930, 6,071,976, and 6,254,990 can be used. More specific examples of the surface cross-linking agent are polyhydric alcohol compounds, such as ethylene glycol, diethylene glycol, triethylene glycol, tetraethylene glycol, polyethylene glycol, propylene glycol, 1,3-propanediol, dipropylene glycol, 2,3,4-trimethyl-1,3-pentanediol, polypropylene glycol, glycerine, polyglycerine, 2-butene-1,4-diol, 1,4-butanediol, 1,3-butanediol, 1,5-pentanediol, 1,6-hexanediol, and 1,2-cyclohexane dimethanol; epoxy compounds, such as ethylene glycol diglycidyl ether and glycidol; polyamine compounds, such as ethylenediamine, diethylenetriamine, triethylenetetramine, tetraethylenepentamine, pentaethylenehexamine, polyethyleneimine, and polyamide polyamine; haloepoxy compounds, such as epichlorohydrin, epibromohydrin, and α-methyl epichlorohydrin; condensates of the polyamine compound and the haloepoxy compound; oxazolidinone compounds such as 2-oxazolidinone (U.S. Pat. No. 6,559,239); oxetane compounds; cyclic urea compounds; and alkylene carbonate compounds such as ethylene carbonate (U.S. Pat. No. 5,409,771). These examples are however not limiting in any particular manner. To maximize the effects of the present invention, Among these surface cross-linking agents, at least one of polyhydric alcohols, the oxetane compounds (US2002/72471), and cyclic urea compounds is preferably used. More preferably, at least one of polyhydric alcohols containing 2 to 10 carbons and oxetane compounds containing 2 to 10 carbons, even more preferably a polyhydric alcohol containing 3 to 8 carbons, is used. Therefore, any one of the compounds listed as examples above may be used alone as the surface cross-linking agent; alternatively two or more of the compounds may be used together in any combination.

In the present step may be preferably used a method of cross-linking the surface with the monomer containing a cross-linking agent (Japanese Patent 2530668), a method of cross-linking the surface with a radical initiator (Japanese Unexamined Patent Publication 99211/1988 (Tokukaisho 63-99211), or a method of cross-linking the surface with a radical initiator and a monomer (US 2005-0048221).

The surface cross-linking agent is used in an amount which, albeit variable depending on the compounds being used and their combinations, falls in a preferable range from not less than 0.001 weight % to not more than 10 weight % or in a more preferable range from not less than 0.01 weight % to not more than 5 weight %, all figures given relative to the water absorbent resin.

Water is preferably used in the present step for surface cross-linking. In other words, the water absorbent resin is preferably mixed with the surface cross-linking agent and water and heated for surface cross-linking. Water is used typically in an amount which, albeit variable depending on the water content of the water absorbent resin being used, falls in a preferable range from not less than 0.5 weight % to not more than 20 weight % or in a more preferable range from not less than 0.5 weight % to not more than 10 weight %, all figures given relative to the water absorbent resin. In the present step, a hydrophilic organic solvent may be used, either in addition to the water or in place of the water, in an amount which falls in a preferable range from 0 to not more than 10 weight %, in a more preferable range from 0 to not more than 5 weight %, and in an even more preferable range from 0 to not more than 3 weight %, all figures given relative to the water absorbent resin.

An acidic substance, such as an organic acid (lactic acid, citric acid, p-toluene sulfonic acid) or an inorganic acid (phosphoric acid, sulfuric acid, sulfurous acid), a basic substance, such as caustic soda or sodium carbonate, or a polyvalent metal such as aluminum sulfate may be used together with the surface cross-linking agent in the present step, in an amount of 0 to 10 weight %, 0 to 5 weight %, or especially, about 0 to 1%, all figures given relative to the water absorbent resin.

If surface cross-linking is done in the present invention, the surface cross-linking agent is mixed in advance with water and/or a hydrophilic organic solvent. The aqueous solution or solution is then preferably sprayed or added dropwise to the water absorbent resin. Spraying is a preferred choice between the two. The average diameter of the sprayed liquid drops is preferably from 0.1 to 300 μm or more preferably from 0.1 to 200 μm.

The mixing device used to mix the water absorbent resin of the present invention with the surface cross-linking agent, water, or hydrophilic organic solvent preferably has a high mixing capability to mix the ingredients uniformly and thoroughly. Example of the mixing device include the cylindrical mixer, the double-walled conical mixer, the high-speed stirring mixer, the V-shaped mixer, the ribbon mixer, the screw mixer, the double-arm kneader, the crush kneader, the rotary mixer, the air current mixer, the turbulizer, the batch-type Lödige mixer, and the continuous Lödige mixer.

The water absorbent resin, after being mixed with the surface cross-linking agent, is preferably treated with heat. The heating temperature (temperature of a heat medium or the material itself) is preferably from 120 to 250° C., more preferably from 150 to 250° C. The heating period is preferably from 1 minute to 2 hours. These conditions are applied in a suitable combination: for example, the water absorbent resin may be heated at 180° C. for 0.1 to 1.5 hours or at 200° C. for 0.1 to 1 hours.

The heat treatment device is not limited in any particular manner provided that the device is capable of uniformly applying heat to the mixture of the surface cross-linking agent and the water absorbent resin. The device however preferably incorporates a large mixing device for uniform and thorough heat treatment. The heat treatment device may be, for example, the belt drier/heating furnace, the groove stirring drier/heating furnace, the screw drier/heating furnace, the rotary drier/heating furnace, the disc drier/heating furnace, the knead drier/heating furnace, fluidized bed drier/heating furnace, the air current drier/heating furnace, the infrared drier/heating furnace, the electron beam drier/heating furnace.

If a liquid permeability improving agent is added, the surface cross-linking may be done before, during, or after the addition of the liquid permeability improving agent as will be detailed later.

(1-5) Use of Method for Producing Water Absorbent Resin

The method for producing a water absorbing agent including a water absorbent resin and a liquid permeability improving agent by further adding a liquid permeability improving agent to a water absorbent resin obtained by the method for producing a water absorbent resin in accordance with the present invention also utilizes the present invention and is therefore encompassed by the present invention.

In other words, the method for producing a water absorbing agent in accordance with the present invention utilizes the method for producing a water absorbent resin in accordance with the present invention and further involves the step of adding a liquid permeability improving agent to the water absorbent resin.

The liquid permeability improving agent may be added before, during, or after the surface cross-linking. To achieve better effects with the present invention, however, the improving agent is preferably added separately after the surface cross-linking. If the dried product is pulverized and classified, the improving agent may be added before, during, or after the pulverization/classification.

A liquid permeability improving agent refers, throughout the specification, to an agent that improves the saline flow conductivity (SFC) of a water absorbent resin (or a water absorbing agent) having an SFC of 6, by 10 or more.

The mixing of the liquid permeability improving agent with the water absorbent resin or agent enables the water absorbent resin or agent to physically or ionically retain its liquid paths after absorption of an aqueous solution. That improves the liquid permeability.

The liquid permeability improving agent is preferably a water-soluble polyvalent metal compound or a polycationic compound and more preferably at least one compound selected from the group consisting of aluminum compounds, zirconium compounds, titanium compounds, and compounds containing amino groups. More specific examples include water-soluble polyvalent metal compounds, such as aluminum sulfate, potassium alum, ammonium alum, sodium alum, aluminum (poly)chloride, and their hydrates; polycationic compounds, such as polyethyleneimine, polyvinyl amine, and polyallylamine; and water-insoluble inorganic fine particles, such as silica, alumina, and bentonite. Any one of these substances may be used alone; alternatively two or more of them may be used together in any combination. Among them, aluminum sulfate, potassium alum and like water-soluble polyvalent metal salts are especially preferred because they can further improve the saline flow conductivity (SFC). The liquid permeability improving agent is preferably soluble in water for easy, uniform applicability across the surface of the water absorbent resin and absence of segregation of the liquid permeability improving agent or similar disadvantage.

The liquid permeability improving agent is used in a ratio of preferably 0.001 to 10 weight %, and more preferably 0.01 to 5 weight %, relative to the water absorbent resin.

The liquid permeability improving agent may be capable of improving the liquid permeability of the water absorbing agent and preferably does not covalently bond to functional groups on the surface of the water absorbent resin.

The liquid permeability improving agent may be added by any method including dry blending or thermal fusion or in the form of an aqueous solution or dispersion liquid.

To describe the methods in more detail, dry blending is a method for uniformly mixing the liquid permeability improving agent (polyvalent metal compound in solid powder form or inorganic fine particles) with the water absorbent resin particles obtained by the drying/pulverization. After the mixing, an aqueous solution, such as water or a polyhydric alcohol, may be further added and mixed if necessary. The mixture may also be heating. The "addition as an aqueous solution" is a method of adding and mixing an aqueous solution of the improving agent, such as a polyvalent metal compound or a polycationic compound, with the water absorbent resin particles. Preferably, the polyvalent metal or polycationic compound preferably has a relatively high concentration. The mixture may be heated if necessary. Thermal fusion is a method of melting and fixing a polyvalent metal hydrate, such as aluminum sulfate, potassium alum, ammonium alum, or sodium alum, to the water absorbent resin particles by mixing the polyvalent metal hydrate with the water absorbent resin particles and either simultaneously or subsequently heating the mixture, or mixing the polyvalent metal hydrate with the water absorbent resin particles that are heated in advance. Water may be added before the heating if necessary.

(1-6) Other Steps

The method for producing a water absorbent resin in accordance with the present invention may further involve an aqueous-monomer-solution preparation step, carried out subsequent to the polymerization step, of preparing an aqueous solution of monomer containing the internal cross-linking agents (A) and (B) and the monomer including the unsaturated monomer containing a carboxyl group.

The method for producing a water absorbent resin in accordance with the present invention may further involve a pulverization step, carried out subsequent to the drying step or the surface cross-linking step, of further pulverizing the dried product or the water absorbent resin after the surface cross-linking step. The conditions under which the dried product is pulverized is not limited in any particular manner: a roll mill, hammer mill, or like conventional pulverizer may be used. The pulverization preferably produces particles of irregular shape. More preferably, some of the particles are agglomerated and have a large surface area.

The pulverized water absorbent resin particles may be further subjected to, for example, classification to adjust the weight average particle diameter and logarithmic standard deviation ($\sigma\zeta$) to fall in a desired range, thereby obtaining an end product.

To carry out classification in the present invention if necessary, the sieves used in the classification need to be selected, considering efficiency of the classification. For example, it is difficult to completely remove particles having particle diameters of 150 μm or less from the water absorbent resin particles or water absorbing agent by using a sieve with 150-μm openings. A suitable type of sieve is preferably selected for use, to obtain water absorbent resin particles or a water absorbing agent having an intended particle diameter.

(2) Water Absorbent Resin in Accordance with the Present Invention and its Usage The present invention encompasses a water absorbent resin, having an internal cross-linked structure and its surface being cross-linked, which is obtained by polymerization of a monomer including an unsaturated monomer containing a carboxyl group. The internal cross-linked structure of the water absorbent resin contains an internal cross-linking agent (A) having at least two or more radical polymerizable unsaturated groups in its single molecule and a non-polymeric internal cross-linking agent (B) having in its single molecule two or more functional groups each of which allows formation of an ester bond or an amide bond in a reaction with a carboxyl group. The ratio of agent (A) to the unsaturated monomer containing a carboxyl group is from 0.01 mol % to 0.2 mol %, inclusive. The molar ratio of agent (B) to agent (A), (B)/(A), is from 0.01 to 1.8, inclusive.

In the present invention, the water absorbent resin is a water-swelling, water-insoluble cross-linked polymer capable of forming a hydrogel. Generally, "water swelling" refers to the ability of a substance of absorbing water at a rate of, for example, at least 5 or more times the weight of the substance in ion-exchanged water. The rate is preferably 10 or more times, more preferably 20 or more times, and even more preferably as much as 50 to 1000 times the weight. In other words, the "water-swelling" cross-linked polymer can be defined as having a "water absorption rate in ion-exchanged water" of at least 5, preferably at least 10, more preferably at least 20, and even more preferably from 50 to 1000. The "water absorption rate in ion-exchanged water" is a value obtained by the same measurement as the measurement of centrifugal retention capacity (CRC) which will be detailed later, except that 0.020 g of a water absorbent resin is used as a sample and the measurement is conducted in ion-exchanged water.

A water absorbent resin being "water insoluble" refers to the uncross-linked, extractable polymer content (water-soluble polymer) of the water absorbent resin being from 0 to 50 weight % of the weight of the entire water absorbent resin, preferably from 0 to 25 weight %, more preferably from 0 to 20 weight %, even more preferably from 0 to 15 weight %, and yet more preferably from 0 to 10 weight %, all inclusive. The uncross-linked, extractable polymer content of the water absorbent resin is defined as the value measured by the following method.

A plastic container with a lid with a 250 mL capacity is charged with 184.3 g of physiological saline (0.9 weight % aqueous solution of sodium chloride) by measurement. 1.00 g of the water absorbent resin is added to the aqueous solution and stirred for 16 hours to extract the soluble content of the resin. The liquid extract is filtered through a single sheet of filtering paper (JIS P 3801 No. 2, available from Advantec Toyo Kaisha, Ltd.: thickness=0.26 mm, retainable particle diameter=5 μm). 50.0 g of the obtained filtrate is set aside by measurement as a sample solution. First, a 0.1 N NaOH aqueous solution is added to the physiological saline alone, up to pH=10. Then, a 0.1 N HCl aqueous solution is added to up to pH=2.7 to determine a blank titer ([bNaOH] mL, [bHCl] mL). The same titration process is performed on the sample solution to determine a titer ([NaOH] mL, [HCl] mL). For example, in the case of a water absorbent resin made of an acrylic acid and its sodium salt of known amounts, the extractable polymer content of the water absorbent resin can be calculated according to the following equation from the average molecular weight of the monomer and the titer determined by the foregoing process. If the water absorbent resin was made of an acrylic acid and its sodium salt of unknown amounts, the average molecular weight of the monomer can be calculated based on the neutralization ratio determined by the titration.

$$\text{Extractable polymer content (weight \%)} = 0.1 \times \text{Average Molecular Weight} \times 184.3 \times 100 \times ([HCl]-[bHCl])/1000/1.0/50.0$$

$$\text{Neutralization Ratio (mol \%)} = [1-([NaOH]-[bNaOH])/([HCl]-[bHCl])] \times 100$$

The water absorbent resin in accordance with the present invention can be polymer obtained by polymerization of an unsaturated monomer containing a carboxyl group. Another monomer may however be used, in the copolymerization together with the unsaturated monomer containing a carboxyl group, in an amount that does not disrupt effects of the present invention. The water absorbent resin in accordance with the present invention can be any polymer obtained in this manner. See (1) above for description of the unsaturated monomer containing a carboxyl group and the other monomer; the description is not duplicated here.

The water absorbent resin of the present invention is internally cross-linked, and the internal cross-linked structure includes the internal cross-linking agent (A) and the internal cross-linking agent (B). The internal cross-linking agent (A), the internal cross-linking agent (B), an amount of the internal cross-linking agent (A), and the molar ratio (B)/(A) between (A) and (B) are not explained here, because they have already been explained in (1).

The internal cross-linking agent (A) is copolymerized with an unsaturated monomer including a carboxyl group, in the water absorbent resin.

The aforesaid functional group in the internal cross-linking agent (B) is covalently bonded to the carboxyl group of the water absorbent resin, but not all of the aforesaid functional groups in a single molecule are required to be covalently bonded to the carboxyl group in the water absorbent resin. Some of the functional groups in a single molecule may exist as free groups, without being covalently bonded to the carboxyl group in the water absorbent resin.

In the water absorbent resin of the present invention, there may be an unreacted internal cross-linking agent (B) in which none of the functional groups in a single molecule of the internal cross-linking agent (B), which has the functional groups being cross-linkable with a carboxyl group, is bonded to a carboxyl groups in the water absorbent resin. An amount of such unreacted internal cross-linking agent (B) in the water absorbent resin, i.e. an amount of the internal cross-linking agent (B) remaining in the water absorbent resin is preferably not larger than $0.1\times10^{-5}$ mol/g. When the amount of the internal cross-linking agent (B) remaining in the water absorbent resin is not larger than $0.1\times10^{-5}$ mol/g, the effect of the cross-linking is sufficient and the properties such as SFC are high.

The quantity of the unreacted internal cross-linking agent (B), i.e. the quantity of the unreacted internal cross-linking agent (B) in the water absorbent resin can be determined by extracting the agent from the water absorbent resin and analyzing the extract by liquid chromatography (LC) or the like. The method of the extraction is not particularly limited, and hence a conventional well-known method can be suitably used. An example of the method of the extraction is such that 1 gram of water absorbent resin is stirred in a 0.9 weight % of sodium chloride solution for not shorter than 2 hours, the sodium chloride solution after the stirring is filtrated, and the extracted liquid obtained as a result of the filtering is analyzed by liquid chromatography.

An internal cross-linking agent (B) in which at least one of the function groups in a single molecule of the agent is bonded to a carboxyl group can be quantified by hydrolyzing the water absorbent resin and analyzing the resulting liquid by gas chromatography-mass spectrometry (GC-MS) or the like.

The water absorbent resin of the present invention is surface cross-linked. The type and amount of the surface cross-linking agent have already been explained in (1), and hence the explanations are omitted.

The present invention encompasses a water absorbing agent including the water absorbent resin of the present invention as a main component, because the agent utilizes the present invention. The water absorbing agent of the present invention is an aqueous liquid absorbing and solidifying agent which includes the water absorbent resin of the present invention as a main component, and includes a small amount of additive if necessary, and water in some cases. The “main component” in this case indicates that the content of the water absorbent resin is not lower than 50 weight % of the entirety of the water absorbing agent. The content of the water absorbent resin in the entirety of the water absorbing agent is preferably not lower than 60 weight %, more preferably not lower than 80 weight %, more preferably not lower than 90 weight %, still more preferably not lower than 95 weight %, and most preferably not lower than 98 weight %.

Examples of the water absorbing agent of the present invention include a water absorbing agent including the water absorbent resin of the present invention and a liquid permeability improving agent. The type and amount of the liquid permeability improving agent have already been explained in (1), and hence the explanations thereof are omitted.

As additives, the water absorbing agent of the present invention may further include, if necessary, deodorant agents, antibacterial agents, perfumes, foaming agents, colorants, dyes, plasticizers, adhesives, surfactants, fertilizers, oxidizers, reducing agents, water, salts, chelating agents, disinfectants, hydrophilic polymers such as polyethyleneglycol, paraffin, hydrophobic polymers, thermoplastic resin such as polyethylene and polypropylene, thermosetting resin such as polyester resin and urea resin, or the like, on condition that the absorbency properties of the water absorbing agent are not deteriorated, for example, about 0 to 10 weight % of the aforesaid substance may be included in the water absorbent resin.

The shapes of the water absorbent resin and the water absorbing agent of the present invention are not particularly limited. Preferably the aforesaid resin and agent are fragmented by crushing in the crushing process, and further preferably the resin and agent are pulverized and classified in the subsequent step so as to have a particular particle diameter. Preferably the water absorbent resin and the water absorbing agent of the present invention have the particles with a particle diameter of less than 850 μm and not less than 150 μm (defined by classification by using sieve: JISZ8801-1:2000) account for not lower than 90 weight % of the total. More preferably, the particles with a particle diameter of less than 850 μm and not less than 150 μm account for 95 weight % of the total. Still more preferably the particles with a particle diameter of less than 850 μm and not less than 150 μm account for 98 weight % of the total. Also, preferably particles with the diameter of not shorter than 300 μm account for 60 weight % of the total. The “total” in this case indicates the entirety of the particle water absorbent resin as to the particle diameter of the water absorbent resin, or indicates the entirety of the water absorbing agent as to the particle diameter of the water absorbing agent.

The weight average particle diameter (D50) of the water absorbent resin or the water absorbing agent is preferably 200 to 850 μm, more preferably 200 to 600 μm, still more preferably 300 to 600 μm, and particularly preferably 300 to 500 μm. The particle diameters of the water absorbent resin and the water absorbing agent may be adjusted by granulation, according to need.

Non-limiting examples of the form of the particles of the water absorbent resin and the water absorbing agent include a spherical shape, a pulverized shape, and an irregular shape. An irregular shape as a result of a pulverizing step is preferable.

In the water absorbent resin and water absorbing agent of the present invention, logarithmic standard deviation ($\sigma\zeta$) of particle diameter distribution is preferably 0.1 to 0.45, more preferably 0.25 to 0.45, and still more preferably 0.30 to 0.40. The smaller the logarithmic standard deviation ($\sigma\zeta$) of particle diameter distribution is, the narrower the particle diameter distribution is. However, in the water absorbent resin and water absorbing agent, the particle diameter distribution is required to be not only narrow but also wide to some degree. When the logarithmic standard deviation ($\sigma\zeta$) is less than 0.1, while a desired performance may not be achieved, the productivity is significantly decreased. When the logarithmic standard deviation ($\sigma\zeta$) is more than 0.45, the particle diameter distribution is so wide that a desired performance may not be achieved.

In the present invention, “particles of not less than 300 μm” indicate particles remaining on a JIS standard sieve having the mesh size of 300 μm after the classification by the below-mentioned sieve classification method. Also, “particles of less than 300 μm” indicates particles passed through a sieve having the mesh size of 300 μm, after the classification by the below-mentioned sieve classification method. The same holds for other mesh sizes. If 50 weight % of particles is classified by a sieve having the mesh size of 300 μm, the weight average particle diameter (D50) is 300 μm.

The centrifugal retention capacity (CRC) of the water absorbent resin and water absorbing agent of the present invention is preferably not lower than 5 g/g. This is preferable because, when the water absorbent resin and water absorbing agent of the present invention are used in a sanitary material such as a diaper, the capabilities of absorption and retention of aqueous solution are good. The centrifugal retention capacity (CRC) of the water absorbent resin and water absorbing agent of the present invention is preferably not lower than 5 g/g and not higher than 50 g/g, more preferably not lower than 15 g/g and not higher than 45 g/g, still more preferably not lower than 26 g/g and not higher than 40 g/g, and particularly preferably not lower than 27 g/g and not higher than 35 g/g. The centrifugal retention capacity (CRC) of not lower than 26 g/g is preferable because the quantity of the water absorbing agent to be used is small.

The water absorbing agent of the present invention excels in absorbent properties such as the centrifugal retention capacity (CRC). Therefore, the water absorbing agent of the present invention is preferably used as an aqueous liquid absorbing and solidifying agent (absorbing gelatinizer) for urine, blood and so on, for sanitary materials such as a disposable diaper, a sanitary napkin, and an incontinence pad.

For sanitary materials, the water absorbing agent of the present invention is, typically in the form of particles, combined with a hydrophilic fiber and molded as an absorbent core. An example of the fiber is a hydrophilic fiber such as crushed wood pulp. Other examples include a cotton linter, a cross-linked cellulose fiber, rayon, cotton, wool, acetate, and vinylon. These fiber materials are preferably aerated.

While not limited to sanitary materials, the water absorbing agent of the present invention can be used as conventional water absorbent resin for an agriculture/horticulture, a cable-waterproofing agent, civil engineering and construction purposes, and foods.

EXAMPLES

Through the following example and comparative example, the present invention is further described. It is noted that the present invention is not limited to them.

A method of measurement and a method of evaluation in the example and the comparative example will be explained.

Unless otherwise stated, the measurement and the evaluation below were conducted in the conditions of the temperatures within the range of 20 to 25° C. and the humidity of 50 RH %.

The target of the measurement and evaluation below may be a water absorbent resin or a water absorbing agent. Therefore, if the target is a water absorbing agent, measurement is carried out while "water absorbent resin" in the description of the method is read as "water absorbing agent".

(a) Centrifugal Retention Capacity (CRC)

0.200 g of water absorbent resin was evenly contained in a bag (60 mm×60 mm) made of a nonwoven fabric (Heatron Paper made by Nangoku Pulp Kogyo Co., Ltd.: model type is GSP-22). Thereafter, the bag was soaked in physiological saline (0.9 weight % sodium chloride solution). The bag was withdrawn 30 minutes later. By using a centrifugal separator (centrifugal machine made by KOKUSAN Corporation: model type is H-122), the bag was drained for three minutes at a centrifugal force of 250 G (250 cm/s$^2$), and a weight $W_1$ (g) of the bag was measured. Further, the same operation was performed without using the water absorbent resin, and a weight $W_0$ (g) was measured. Then, from the weights $W_1$ and $W_0$, a centrifugal retention capacity (CRC) (g/g) was calculated according to the following equation.

$$\text{CRC (g/g)}=[(W_1\text{ (g)}-W_0\text{ (g)})/\text{weight of water absorbent resin (g)}]-1$$

(b) Particle Diameter

The particle diameter was measured according to the measurement of the mass average particle diameter (D50), which is disclosed in WO2004/69915.

The water absorbent resin after pulverizing was sieved by using JIS standard sieves respectively having mesh sizes of 850 μm, 710 μm, 600 μm, 500 μm, 425 μm, 300 μm, 212 μm, 150 μm, 45 μm, and the like, and a residual percentage R was plotted on a logarithmic probability paper, thereby reading a the mass average particle diameter (D50). In case where water absorbent resin having the diameter longer than 850 μm is included, a commercially-available JIS standard sieve having a mesh size of larger than 850 μm is suitably used.

(c) Logarithmic Standard Deviation (σζ) of Particle Diameter Distribution

The logarithmic standard deviation (σζ) of particle diameter distribution was calculated according to the method recited in WO2004/69915.

The water absorbent resin was sieved by using JIS standard sieves respectively having mesh sizes of 850 μm, 710 μm, 600 μm, 500 μm, 425 μm, 300 μm, 212 μm, 150 μm, 45 μm, and the like, and a residual percentage R was plotted on a logarithmic probability paper. In case where water absorbent resin having the diameter longer than 850 μm is included, a commercially-available JIS standard sieve having a mesh size of larger than 850 μm is suitably used. Assuming that X1 is a particle diameter in case where R=84.1 weight % and X2 is a particle diameter in case where R=15.9 weight %, the logarithmic standard deviation (σζ) is represented by the following equation. As a value of σζ is smaller, the particle diameter distribution is narrower.

$$\sigma\zeta=0.5\times\ln(X2/X1)$$

Classification in measuring the logarithmic standard deviation (σζ) of the particle diameter and the particle diameter distribution was performed as follows: 10.0 g of the water absorbent resin particles was spread on JIS standard sieves (THE IIDA TESTING SIEVE: diameter is 8 cm) respectively having mesh sizes of 850 μm, 710 μm, 600 μm, 500 μm, 425 μm, 300 μm, 212 μm, 150 μm, and 45 μm, and was classified by using a sieve shaker (IIDA SIEVE SHAKER, TYPE: ES-65, SER. No. 0501) for five minutes.

(d) Paint Shaker Test

A paint shaker test (PS) was performed as follows. 10 g of glass beads each of which had a diameter of 6 mm were taken to a glass container whose diameter was 6 cm and whose height was 11 cm. 30 g of water absorbent resin or water absorbing agent was placed therein. The glass container was set in a paint shaker (product of Toyo Seiki Seisaku-sho, Ltd.: Product No. 488) and was shaken at 800 cycle/min (CPM). This device is detailed in Japanese Unexamined Patent Application No. 235378/1996 (Tokukaihei 9-235378).

A result obtained by shaking the paint shaker for 30 minutes is described as "paint shaker test 1", and a result obtained by shaking the paint shaker for 10 minutes is described as "paint shaker test 2". After shaking the paint shaker, the glass beads were removed by a JIS standard sieve whose mesh size was 2 mm so as to give damaged water absorbent resin or water absorbing agent.

Example 1

1-1

A solution (I) was prepared by mixing 215.2 g of acrylic acid, 1.31 g (0.07 mol %) of polyethylene glycol diacrylate (molecular weight of 523), 0.0322 g (0.01 mol %) of 1,4-butanediol and 1.58 g of 1.0 mass % diethylenetriamine penta acetic acid penta sodium salt aqueous solution with each other. Further, a solution (II) was prepared by mixing 215.2 g of 48.5 mass % sodium hydroxide aqueous solution with 209.9 g of ion exchange water whose temperature had been adjusted to 32° C. In a polypropylene container which had an internal diameter of 80 mm and a capacity of 1 litter, the solution (II) was quickly added to the solution (I) in an open manner while being stirred by a magnetic stirrer, thereby obtaining a monomer aqueous solution whose temperature had risen to approximately 102° C. due to heat of neutralization and heat of dissolution.

When the temperature of the monomer aqueous solution was decreased to 95° C., 14.30 g of 3 mass % sodium persulfate aqueous solution was added to thus obtained monomer aqueous solution, and the mixture was stirred for several seconds. Thereafter, the resultant was poured in an open manner into a stainless tray-type container whose surface was heated up to 100° C. by a hot plate (NEO HOTPLATE H1-1000: product of IUCHI SEIEIDO CO., LTD.). The stainless tray-type container was internally coated with teflon (registered trademark), and its bottom size was 250×250 mm and top size was 640×640 mm and height was 50 mm so that its central cross-sectional surface was trapezoid with its top open.

Polymerization was initiated right after the monomer aqueous solution to which the sodium persulfate aqueous solution was added had been poured. The polymerization was promoted while generating vapors and expanding/foaming vertically and horizontally. Thereafter, the resultant dwindled so as to be slightly larger than the bottom size. The expanding/dwindling came to an end within approximately one minute. After the resultant had been left in the container for 4 minutes, a resultant cross-linked polymer hydrogel was removed.

1-2

Thus obtained cross-linked polymer hydrogel was crushed by a meat chopper (ROYAL MEAT CHOPPER VR400K: product of IIZUKA KOGYO KABUSHIKIKAISHA) whose dice diameter was 9.5 mm, thereby obtaining a cross-linked polymer hydrogel that had been crushed. An amount of the charged gel was approximately 340 g/min, and the crushing was performed by adding deionized water at 48 g/min, concurrently with the charge of the gel. A nonvolatile amount of the gel after the crushing was 50 through 55 mass %.

1-3

The cross-linked polymer hydrogel that had been crushed was spread out on a wire mesh of 50 mesh, and was dried by hot air at 180° C. for 35 minutes.

1-4

The dried product thus obtained was pulverized by using a roll mill, and then classified by using a JIS standard sieve whose mesh size was 710 μm and a JIS standard sieve whose mesh size was 175 μm, thereby obtaining a water absorbent resin having an irregularly pulverized shape.

1-5

The aforesaid operations [1-1] through [1-4] were performed 5 times in total, and the centrifugal retention capacity (CRC) of each water absorbent resin was measured.

The centrifugal retention capacities (CRC) of the respective water absorbent resins are, from the first time to the fifth time, 38 (g/g), 37 (g/g), 37 (g/g), 37 (g/g), and 37 (g/g).

The average of these results was 37.2 (g/g), the standard deviation was 0.4, and the CRC instability index after the drying was 4.

Note that, the CRC instability index after the drying is calculated in accordance with the following expression.

$$\text{CRC instability index after the drying}=(\text{standard deviation } \sigma\times 3)/(\text{average value})\times 100$$

Mixing these five water absorbent resins, a water absorbent resin (1) was obtained. the mass average particle diameter (D50) of the water absorbent resin (1) was 342 μm, and the logarithmic standard deviation (σζ) of the particle diameter distribution was 0.32.

1-6

In 100 parts by mass of thus obtained water absorbent resin (1), a surface cross-linking agent including 0.3 parts by mass of 1,4-butanediol, 0.6 parts by mass of propyleneglycol, and 3.0 parts by mass of pure water, were mixed. The mixture was then heated at 195° C. for 30 minutes. Then the particles were subjected to the paint shaker test 1. Subsequently, a mixture solution including 0.80 parts by mass of 27 mass % aluminum sulfate aqueous solution (8 mass % aluminum oxide), 0.134 parts by mass of 60 mass % sodium lactate aqueous solution, and 0.016 parts by mass of propylene glycol was added to 100 parts by mass of the water absorbent resin. After the addition, drying was performed in without wind at 60° C. for one hour, and the particles were sieved by a JIS standard sieve having mesh size of 710 μm. Thereafter, the paint shaker test 2 was conducted. The resultant was a water absorbing agent (1). In the water absorbing agent (1), an amount of the particles passing through a sieve having mesh size of 150 μm was 3.7 mass %.

Example 2

The operations identical with the above-described [1-1]-[1-4] were performed, except that an amount of 1,4-butanediol was changed to 0.0805 g (0.025 mol %) from Example 1.

The aforesaid group of operations was conducted five times, and the centrifugal retention capacities (CRC) of the respective resultant water absorbent resins were measured.

The centrifugal retention capacities (CRC) of the respective water absorbent resins were, from the first time to the fifth time, 37 (g/g), 36 (g/g), 37 (g/g), 37 (g/g), and 37 (g/g).

The average of these results was 36.8 (g/g), the standard deviation was 0.4, and the CRC instability index after the drying was 4.

Mixing these five water absorbent resins, a water absorbent resin (2) was obtained. The mass average particle diameter (D50) of the water absorbent resin (2) was 342 μm, and the logarithmic standard deviation (σζ) of the particle diameter distribution was 0.32.

The operation identical with [1-6] in Example 1 was carried out using the water absorbent resin (2) in place of the water absorbent resin (1). The resultant was a water absorbing agent (2). In the water absorbing agent (2), an amount of the particles passing through a sieve having mesh size of 150 μm was 3.3 mass %.

Example 3

The operations identical with the above-described [1-1]-[1-4] were performed, except that an amount of 1,4-butanediol was changed to 0.1128 g (0.035 mol %) from Example 1.

The aforesaid group of operations was conducted five times, and the centrifugal retention capacities (CRC) of the respective resultant water absorbent resins were measured.

The centrifugal retention capacities (CRC) of the respective water absorbent resins were, from the first time to the fifth time, 36 (g/g), 36 (g/g), 36 (g/g), 37 (g/g), and 37 (g/g).

The average of these results was 36.4 (g/g), the standard deviation was 0.5, and the CRC instability index after the drying was 5.

Mixing these five water absorbent resins, a water absorbent resin (3) was obtained. The mass average particle diameter (D50) of the water absorbent resin (3) was 342 μm, and the logarithmic standard deviation (σζ) of the particle diameter distribution was 0.32.

The operation identical with [1-6] in Example 1 was carried out using the water absorbent resin (3) in place of the water absorbent resin (1). The resultant was a water absorbing agent (3). In the water absorbing agent (3), an amount of the particles passing through a sieve having mesh size of 150 μm was 3.5 mass %.

Example 4

The operations identical with the above-described [1-1]-[1-4] were performed, except that 0.952 g (0.035 mol %) of propyleneglycol was used instead of 1,4-butanediol in Example 1.

The aforesaid group of operations was conducted five times, and the centrifugal retention capacities (CRC) of the respective resultant water absorbent resins were measured.

The centrifugal retention capacities (CRC) of the respective water absorbent resins were, from the first time to the fifth time, 37 (g/g), 36 (g/g), 37 (g/g), 37 (g/g), and 37 (g/g).

The average of these results was 36.8 (g/g), the standard deviation was 0.45, and the CRC instability index after the drying was 4.

Mixing these five water absorbent resins, a water absorbent resin (4) was obtained. The mass average particle diameter (D50) of the water absorbent resin (4) was 342 μm, and the logarithmic standard deviation (σζ) of the particle diameter distribution was 0.32.

The operation identical with [1-6] in Example 1 was carried out using the water absorbent resin (4) in place of the water absorbent resin (1). The resultant was a water absorbing agent (4). In the water absorbing agent (4), an amount of the particles passing through a sieve having mesh size of 150 μm was 3.8 mass %.

Example 5

The operations identical with the above-described [1-1]-[1-4] were performed, except that 0.115 g (0.035 mol %) of glycerin was used instead of 1,4-butanediol in Example 1.

The aforesaid group of operations was conducted five times, and the centrifugal retention capacities (CRC) of the respective resultant water absorbent resins were measured.

The centrifugal retention capacities (CRC) of the respective water absorbent resins were, from the first time to the fifth time, 33 (g/g), 34 (g/g), 32 (g/g), 33 (g/g), and 33 (g/g).

The average of these results was 33.0 (g/g), the standard deviation was 0.71, and the CRC instability index after the drying was 6.

Mixing these five water absorbent resins, a water absorbent resin (5) was obtained. The mass average particle diameter (D50) of the water absorbent resin (5) was 342 μm, and the logarithmic standard deviation (σζ) of the particle diameter distribution was 0.32.

The operation identical with [1-6] in Example 1 was carried out using the water absorbent resin (5) in place of the water absorbent resin (1). The resultant was a water absorbing agent (5). In the water absorbing agent (5), an amount of the particles passing through a sieve having mesh size of 150 μm was 4.3 mass %.

Comparative Example 1

The operations identical with the above-described [1-1]-[1-4] were performed, except that an amount of polyethylene glycol diacrylate (molecular weight of 523) was changed to 1.78 g (0.095 mol %) from 1.31 g (0.07 mol %) in Example 1 and an amount of 1,4-butanediol was changed to 0.

The aforesaid group of operations was conducted five times, and the centrifugal retention capacities (CRC) of the respective resultant comparative water absorbent resins were measured.

The centrifugal retention capacities (CRC) of the respective comparative water absorbent resins were, from the first time to the fifth time, 31 (g/g), 32 (g/g), 32 (g/g), 32 (g/g), and 32 (g/g).

The average of these results was 31.8 (g/g), the standard deviation was 0.4, and the CRC instability index after the drying was 4.

Mixing these five water absorbent resins, a comparative water absorbent resin (1) was obtained. The mass average particle diameter (D50) of the comparative water absorbent resin (1) was 342 μm, and the logarithmic standard deviation (σζ) of the particle diameter distribution was 0.32.

The operation identical with [1-6] in Example 1 was carried out using the comparative water absorbent resin (1) in place of the water absorbent resin (1). In the comparative water absorbent resin (1), an amount of the particles passing through a sieve having mesh size of 150 μm was 5.3 mass %.

Comparative Example 2

The operations identical with the above-described [1-1]-[1-4] were performed, except that an amount of polyethylene glycol diacrylate (molecular weight of 523) was changed to 4.67 g (0.25 mol %) from 1.31 g (0.07 mol %) in Example 1 and 1,4-butanediol was replaced with 1.152 g (0.35 mol %) glycerin.

The aforesaid group of operations was conducted five times, and the centrifugal retention capacities (CRC) of the respective resultant comparative water absorbent resins were measured.

The centrifugal retention capacities (CRC) of the respective comparative water absorbent resins were, from the first time to the fifth time, 25 (g/g), 24 (g/g), 25 (g/g), 25 (g/g), and 26 (g/g).

The average of these results was 25.0 (g/g), the standard deviation was 0.7, and the CRC instability index after the drying was 8.

Mixing these five water absorbent resins, a comparative water absorbent resin (2) was obtained. The mass average particle diameter (D50) of the comparative water absorbent resin (2) was 342 μm, and the logarithmic standard deviation (σζ) of the particle diameter distribution was 0.32.

The operation identical with [1-6] in Example 1 was carried out using the comparative water absorbent resin (2) in place of the water absorbent resin (1). In the comparative water absorbent resin (2), an amount of the particles passing through a sieve having mesh size of 150 μm was 6.9 mass %.

Comparative Example 3

The operations identical with the above-described [1-1]-[1-4] were performed, except that an amount of polyethylene glycol diacrylate (molecular weight of 523) was changed to 0.187 g (0.01 mol %) from 1.31 g (0.07 mol %) in Example 1 and 1,4-butanediol was replaced with 0.132 g (0.04 mol %) glycerin.

The aforesaid group of operations was conducted five times, and the centrifugal retention capacities (CRC) of the respective resultant comparative water absorbent resins were measured.

The centrifugal retention capacities (CRC) of the respective comparative water absorbent resins were, from the first time to the fifth time, 52 (g/g), 57 (g/g), 55 (g/g), 53 (g/g), and 58 (g/g).

The average of these results was 55.0 (g/g), the standard deviation was 2.5, and the CRC instability index after the drying was 14.

Mixing these five water absorbent resins, a comparative water absorbent resin (3) was obtained. The mass average particle diameter (D50) of the comparative water absorbent resin (3) was 342 μm, and the logarithmic standard deviation (σζ) of the particle diameter distribution was 0.32.

The operation identical with [1-6] in Example 1 was carried out using the comparative water absorbent resin (3) in place of the water absorbent resin (1). In the comparative water absorbent resin (3), an amount of the particles passing through a sieve having mesh size of 150 μm was 3.4 mass %.

Comparative Example 4

The operation was performed as in [1-1] through [1-4] of Example 1, but the amount of 1,4-butanediol was 0.4188 g (0.13 mol %) instead of 0.0322 g (0.01 mol %) in Example 1.

The same operation as above was performed a total of five times. Then, the respective centrifugal retention capacities (CRCs) of the obtained five comparative water absorbent resins were measured.

The centrifugal retention capacities (CRCs) of the obtained first to fifth comparative water absorbent resins were 31 (g/g), 32 (g/g), 33 (g/g), 31 (g/g), and 34 (g/g), respectively.

An average value calculated from these values was 32.2 (g/g), standard deviation was 1.3, and CRC instability index after drying was 12.

It was assumed that a mixture of the above five water absorbent resins was a comparative water absorbent resin (4). The mass average particle diameter (D50) of the comparative water absorbent resin (4) was 342 μm, and the particle diameter distribution logarithmic standard deviation (σζ) thereof was 0.32.

The operation was performed as in [1-6] of Example 1 by using the comparative water absorbent resin (4) instead of the water absorbent resin (1). In this manner, a comparative water absorbing agent (4) was obtained. The amount of particles of the comparative water absorbing agent (4) having passed through a sieve having a mesh size of 150 μm was 4.5 mass %.

Comparative Example 5

The operation was performed as in [1-1] through [1-4] of Example 1, but the amount of polyethylene glycol diacrylate (molecular weight of 523) was 1.87 g (0.10 mol %) instead of 1.31 g (0.07 mol %) in Example 1, and 0.623 g (0.10 mol %) of ethylene glycol diglycidyl ether (molecular weight of 174.2) was used instead of 1,4-butanediol.

The same operation as above was performed a total of five times. Then, the respective centrifugal retention capacities (CRCs) of the obtained five comparative water absorbent resins were measured.

The centrifugal retention capacities (CRCs) of the obtained first to fifth comparative water absorbent resins were 27 (g/g), 27 (g/g), 26 (g/g), 27 (g/g), and 27 (g/g), respectively.

An average value calculated from these values was 26.8 (g/g), standard deviation was 0.4, and CRC instability index after drying was 5.

It was assumed that a mixture of the above five water absorbent resins was a comparative water absorbent resin (5). The mass average particle diameter (D50) of the comparative water absorbent resin (5) was 342 μm, and the particle diameter distribution logarithmic standard deviation (σζ) thereof was 0.32.

The operation was performed as in [1-6] of Example 1 by using the comparative water absorbent resin (5) instead of the water absorbent resin (1). In this manner, a comparative water absorbing agent (5) was obtained. The amount of particles of the comparative water absorbing agent (5) having passed through a sieve having a mesh size of 150 μm was 6.8 mass %.

Comparative Example 6

The operation was performed as in [1-1] through [1-4] of Example 1, but 0.667 g (0.063 mol %) of trimethylolpropane triacrylate (molecular weight of 296.32) was used instead of polyethylene glycol diacrylate (molecular weight of 523), and 0.402 g (0.122 mol %) of glycerin was used instead of 1,4-butanediol.

The same operation as above was performed a total of five times. Then, the respective centrifugal retention capacities (CRCs) of the obtained five comparative water absorbent resins were measured.

The centrifugal retention capacities (CRCs) of the obtained first to fifth comparative water absorbent resins were 32 (g/g), 32 (g/g), 35 (g/g), 34 (g/g), and 35 (g/g), respectively.

An average value calculated from these values was 33.6 (g/g), standard deviation was 1.5, and CRC instability index after drying was 14.

It was assumed that a mixture of the above five water absorbent resins was a comparative water absorbent resin (6). The mass average particle diameter (D50) of the comparative water absorbent resin (6) was 342 Mm, and the particle diameter distribution logarithmic standard deviation (σζ) thereof was 0.32.

The operation was performed as in [1-6] of Example 1 by using the comparative water absorbent resin (6) instead of the water absorbent resin (1). In this manner, a comparative water absorbing agent (6) was obtained. The amount of particles of the comparative water absorbing agent (6) having passed through a sieve having a mesh size of 150 μm was 4.4 mass %.

The results in Examples 1 through 3 and Comparative Examples 1 through 6 are shown in Tables 1 and 2.

TABLE 1

| | (A) | (A) mol % | (B) | (B) mol % | (B)/(A) | Resultant products |
|---|---|---|---|---|---|---|
| Example 1 | PEGDA | 0.070 | 1,4-BD | 0.010 | 0.14 | Water absorbent resin (1) |
| Example 2 | PEGDA | 0.070 | 1,4-BD | 0.025 | 0.36 | Water absorbent resin (2) |
| Example 3 | PEGDA | 0.070 | 1,4-BD | 0.035 | 0.50 | Water absorbent resin (3) |
| Example 4 | PEGDA | 0.070 | PG | 0.035 | 0.50 | Water absorbent resin (4) |
| Example 5 | PEGDA | 0.070 | glycerin | 0.035 | 0.50 | Water absorbent resin (5) |
| Comparative Example 1 | PEGDA | 0.095 | — | — | — | Comparative water absorbent resin (1) |

TABLE 1-continued

| | (A) | (A) mol % | (B) | (B) mol % | (B)/(A) | Resultant products |
|---|---|---|---|---|---|---|
| Comparative Example 2 | PEGDA | 0.250 | glycerin | 0.350 | 1.40 | Comparative water absorbent resin (2) |
| Comparative Example 3 | PEGDA | 0.010 | glycerin | 0.040 | 4.00 | Comparative water absorbent resin (3) |
| Comparative Example 4 | PEGDA | 0.070 | 1,4-BD | 0.130 | 1.86 | Comparative water absorbent resin (4) |
| Comparative Example 5 | PEGDA | 0.100 | EGDGE | 0.100 | 1.00 | Comparative water absorbent resin (5) |
| Comparative Example 6 | TMPTA | 0.063 | glycerin | 0.122 | 1.94 | Comparative water absorbent resin (6) |

PEGDA: polyethylene glycol diacrylate
EGDGE: ethylene glycol diglycidyl ether
1,4-BD: 1,4-butanediol
TMPTA: trimethylolpropane triacrylate
PG: propyleneglycol

TABLE 2

| | Amount of 150 μm or less fine powder in water absorbent resin (%) | CRC after drying and before surface crosslinking: Instability index | Average value (g/g) | σ | Measured value n = 5 (g/g) | | | | |
|---|---|---|---|---|---|---|---|---|---|
| Example 1 | 3.7 | 4 | 37.2 | 0.45 | 38 | 37 | 37 | 37 | 37 |
| Example 2 | 3.3 | 4 | 36.8 | 0.45 | 37 | 36 | 37 | 37 | 37 |
| Example 3 | 3.5 | 5 | 36.4 | 0.55 | 36 | 36 | 36 | 37 | 37 |
| Example 4 | 3.8 | 4 | 36.8 | 0.45 | 37 | 36 | 37 | 37 | 37 |
| Example 5 | 4.3 | 6 | 33.0 | 0.71 | 33 | 34 | 32 | 33 | 33 |
| Comparative Example 1 | 5.3 | 4 | 31.8 | 0.45 | 31 | 32 | 32 | 32 | 32 |
| Comparative Example 2 | 6.9 | 8 | 25 | 0.71 | 25 | 24 | 25 | 25 | 26 |
| Comparative Example 3 | 3.4 | 14 | 55 | 2.55 | 52 | 57 | 55 | 53 | 58 |
| Comparative Example 4 | 4.5 | 12 | 32.2 | 1.30 | 31 | 32 | 33 | 31 | 34 |
| Comparative Example 5 | 6.8 | 5 | 26.8 | 0.45 | 27 | 27 | 26 | 27 | 27 |
| Comparative Example 6 | 4.4 | 14 | 33.6 | 1.52 | 32 | 32 | 35 | 34 | 35 |

An L value (Lightness) of each of the water absorbent resins obtained in the aforementioned Examples was 90 or more in Hunter's Lab color system on its resin surface, which shows that the water absorbent resin was less colored.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention relates to: (i) a method for producing a water absorbent resin, including the steps of crushing a cross-linked polymer hydrogel obtained by polymerization in the presence of the internal cross-linking agent into a size that allows the cross-linked polymer hydrogel to be easily dried, and thereafter drying the thus crushed cross-linked polymer hydrogel, wherein a reduced amount of fine powder is produced even when polymerization is carried out in a region where an internal crosslinking agent abounds; and (ii) use thereof. Therefore, it is possible to solve the problem of deteriorated performance of a water absorbent resin due to fine powder produced when the polymerization is carried out in a region where an internal crosslinking agent abounds and the safety and hygiene problem.

A production method of a water absorbent resin, a water absorbent resin, and a water absorbing agent according to the present invention can be widely used not only for sanitary materials, but also for applications of the conventional water absorbent resins, such as agriculture and horticulture, water-sealing material for cable, civil engineering and construction, and foods.

Therefore, the present invention is very useful since it can be used not only in sanitary material manufacturing industry, horticultural industry, civil engineering and construction industry, and food industry, in which these products are produced, but also in chemical industry in which water absorbing agents are produced.

The invention claimed is:

1. A method for producing a water absorbent resin, comprising the steps of:

(i) polymerizing a monomer including an unsaturated monomer containing a carboxyl group, in the presence of an internal cross-linking agent (A) having two or more radical polymerizable unsaturated groups in its single molecule and in the presence of a non-polymeric internal cross-linking agent (B) having in its single molecule two or more functional groups each of which allows formation of an ester bond or an amide bond by reacting with a carboxyl group so as to obtain a cross-linked polymer hydrogel;

(ii) crushing the cross-linked polymer hydrogel obtained in the step (i); and (iii) drying the crushed cross-linked polymer hydrogel products obtained in the step (ii) to obtain the water absorbent resin having an amount of remaining internal cross-linking agent (B) of not more than $1.0\times10^{-5}$ mol/g, wherein:

an amount of the internal cross-linking agent (A) is 0.01 mol % or more and 0.2 mol % or less relative to an amount of the unsaturated monomer containing a carboxyl group, and a molar ratio (B)/(A) of the internal cross-linking agent (A) and the non-polymeric internal cross-linking agent (B) is 0.01 or more and 1.8 or less.

2. The method as set forth in claim 1, wherein the internal cross-linking agent (B) has in its single molecule two or three functional groups each of which allows formation of an ester bond or an amide bond by reacting with a carboxyl group.

3. The method as set forth in claim 1, wherein each of the functional groups of the internal cross-linking agent (B) allows formation of the ester bond or the amide bond by reacting with a carboxyl group at 110° C. or higher temperature.

4. The method as set forth in claim 1, wherein each of the functional groups is a hydroxyl group.

5. The method as set forth in claim 1, wherein a molecular weight of the internal cross-linking agent (B) is 40 or more and 500 or less.

6. The method as set forth in claim 1, wherein the unsaturated monomer containing a carboxyl group is an acrylic acid and/or an alkali metal salt thereof.

7. The method as set forth in claim 1, further comprising the step (iv) of mixing the water absorbent resin obtained in the step (iii) with a surface cross-linking agent and heating the mixture so as to cross-link the surface of the water absorbent resin.

8. The method as set forth in claim 7, wherein: the step (iv) is carried out so that a centrifugal retention capacity (CRC) of the water absorbent resin whose surface has been cross-linked is lower, by not less than 3 g/g, than a centrifugal retention capacity of the water absorbent resin whose surface has not been cross-linked and the centrifugal retention capacity (CRC) of the water absorbent resin whose surface has been cross-linked is not less than 26 g/g.

9. The method as set forth in claim 7, wherein the step (iv) is carried out so that an amount of the internal cross-linking agent (B) remaining in the water absorbent resin whose surface has been cross-linked is not more than $0.1\times10^{-5}$ mol/g.

10. A method for producing a water absorbing agent including a water absorbent resin and a liquid permeability improving agent, said method comprising the step of adding the liquid permeability improving agent to the water absorbent resin having been produced by the method as set forth in claim 1.

11. A method for producing a water absorbing agent including a water absorbent resin and a liquid permeability improving agent, said method comprising the step of adding the liquid permeability improving agent to the water absorbent resin having been produced by the method as set forth in claim 8.

12. The method as set forth in claim 1, wherein polymerization in the step (i) is static polymerization using a conveyor-belt type polymerization device or stirred polymerization using a single shaft agitator or an agitator having plural agitation shafts.

13. The method as set forth in claim 1, wherein the cross-linked polymer hydrogel obtained in the step (i) is in a shape of a thick plate, a block, a sheet, or a particle.

14. The method as set forth in claim 13, wherein the cross-linked polymer hydrogel is in the shape of a thick plate or a sheet and has a thickness from 1 mm to 5 cm inclusive.

15. The method as set forth in claim 13, wherein the cross-linked polymer hydrogel is in the shape of a particle and has an average particle diameter ranging from 0.1 mm to 5 mm.

16. The method as set forth in claim 1, wherein in the step (iii), the cross-linked polymer hydrogel is crushed into crushed particulate articles of the cross-linked polymer hydrogel as it is extruded through a porous plate.

17. The method as set forth in claim 16, wherein holes of the porous plate have a diameter ranging from 6.5 mm to 18 mm.

18. The method as set forth in claim 16, wherein the porous plate has an aperture ratio ranging from 25% to 90%.

19. The method as set forth in claim 1, wherein a water content in the cross-linked polymer hydrogel obtained from step (i) ranges from 10% to 70%.

20. A water absorbent resin, obtained by polymerization of a monomer including an unsaturated monomer containing a carboxyl group, the water absorbent resin having an internal cross-linked structure and its surface being cross-linked, the internal cross-linked structure containing an internal cross-linking agent (A) having at least two or more radical polymerizable unsaturated groups in its single molecule and a non-polymeric internal cross-linking agent (B) having in its single molecule two or more functional groups each of which allows formation of an ester bond or an amide bond in a reaction with a carboxyl group, a ratio of the internal cross-linking agent (A) to the unsaturated monomer containing a carboxyl group being from 0.01 mol % to 0.2 mol %, inclusive, and a molar ratio of the internal cross-linking agent (B) to the internal cross-linking agent (A), (B)/(A), being from 0.01 to 1.8, inclusive, and an amount of the internal cross-linking agent (B) remaining in the water absorbent resin is not more than $1.0\times10^{-}5$ mol/g.

21. A water absorbing agent including a water absorbent resin as set forth in claim 20 and a liquid permeability improving agent.

22. A sanitary material comprising a water absorbent resin as set forth in claim 20.

* * * * *